(12) United States Patent
Lott

(10) Patent No.: US 10,705,224 B2
(45) Date of Patent: Jul. 7, 2020

(54) METHODS AND SYSTEMS FOR UTILIZING DUAL GLOBAL POSITIONING SYSTEM (GPS) ANTENNAS IN VERTICAL TAKE-OFF AND LANDING (VTOL) AERIAL VEHICLES

(71) Applicant: AeroVironment, Inc., Simi Valley, CA (US)

(72) Inventor: William Arden Lott, Simi Valley, CA (US)

(73) Assignee: AEROVIRONMENT, Simi Valley, CA (US)

( * ) Notice: Subject to any disclaimer, the term of this patent is extended or adjusted under 35 U.S.C. 154(b) by 0 days.

(21) Appl. No.: 16/260,983

(22) Filed: Jan. 29, 2019

(65) Prior Publication Data
US 2019/0235090 A1 Aug. 1, 2019

Related U.S. Application Data

(60) Provisional application No. 62/623,490, filed on Jan. 29, 2018.

(51) Int. Cl.
*G01S 19/42* (2010.01)
*G05D 1/08* (2006.01)
(Continued)

(52) U.S. Cl.
CPC ........ *G01S 19/425* (2013.01); *B64C 29/0016* (2013.01); *G05D 1/0858* (2013.01);
(Continued)

(58) Field of Classification Search
CPC .......................... G01S 19/425; B64C 29/0016
See application file for complete search history.

(56) References Cited

U.S. PATENT DOCUMENTS 7,468,695 B1 * 12/2008 Williams .................. F41G 3/06
342/357.37
8,896,479 B2 * 11/2014 Wang ....................... G01S 7/023
342/13
(Continued)

FOREIGN PATENT DOCUMENTS

CN 203722616 U 7/2014
CN 106226795 B 1/2018

OTHER PUBLICATIONS

International Search Report and Written Opinion of the International Searching Authority for PCT/US19/15642, dated Apr. 25, 2019.

*Primary Examiner* — Marcus E Windrich
(74) *Attorney, Agent, or Firm* — Brooks Acordia IP Law, PC; Michael Zarrabian; Eric Aagaard

(57) ABSTRACT

Systems, devices, and methods for a vertical take-off and landing (VTOL) aerial vehicle having a first GPS antenna and a second GPS antenna, where the second GPS antenna is disposed distal from the first GPS antenna; and an aerial vehicle flight controller, where the flight controller is configured to: utilize a GPS antenna signal via the GPS antenna switch from the first GPS antenna or the second GPS antenna; receive a pitch level of the aerial vehicle from the one or more aerial vehicle sensors in vertical flight or horizontal flight; determine if the received pitch level is at a set rotation from vertical or horizontal; and utilize the GPS signal not being utilized via the GPS antenna switch if the determined pitch level is at or above the set rotation.

20 Claims, 13 Drawing Sheets

(51) Int. Cl.
  *G05D 1/10*    (2006.01)
  *H01Q 1/28*    (2006.01)
  *B64C 29/00*   (2006.01)

(52) U.S. Cl.
  CPC .............. *G05D 1/102* (2013.01); *H01Q 1/281*
        (2013.01); *H01Q 1/286* (2013.01); *B64C*
                            *2201/146* (2013.01)

(56) References Cited

U.S. PATENT DOCUMENTS

| | | | |
|---|---|---|---|
| 10,095,242 B1 | 10/2018 | Novak | |
| 2003/0149512 A1* | 8/2003 | Hrovat | B60T 8/172 |
| | | | 701/1 |
| 2007/0118286 A1* | 5/2007 | Wang | G01S 19/21 |
| | | | 342/357.59 |
| 2008/0162044 A1 | 7/2008 | Koutari | |
| 2009/0069957 A1* | 3/2009 | Nakamura | B64D 43/00 |
| | | | 701/3 |
| 2016/0093124 A1* | 3/2016 | Shi | B64D 47/08 |
| | | | 701/2 |
| 2016/0114887 A1* | 4/2016 | Zhou | B60F 5/02 |
| | | | 348/148 |
| 2017/0233070 A1* | 8/2017 | Starace | G05D 1/0088 |
| | | | 244/7 B |
| 2017/0235303 A1 | 8/2017 | Haruta et al. | |
| 2017/0253241 A1 | 9/2017 | Filev et al. | |
| 2017/0320570 A1* | 11/2017 | Horn | B64C 29/02 |

* cited by examiner

METHODS AND SYSTEMS FOR UTILIZING DUAL GLOBAL POSITIONING SYSTEM (GPS) ANTENNAS IN VERTICAL TAKE-OFF AND LANDING (VTOL) AERIAL VEHICLES

CROSS-REFERENCE TO RELATED APPLICATION

This application claims the priority benefit of U.S. Provisional Patent Application Ser. No. 62/623,490 filed Jan. 29, 2018, incorporated herein by reference in its entirety

FIELD OF ENDEAVOR

The invention relates to aerial vehicle navigation, and more particularly to vertical take-off and landing (VTOL) aerial vehicle navigation.

BACKGROUND

Vertical take-off and landing (VTOL) aerial vehicles may take-off vertically, transition from vertical flight to horizontal flight, and fly forward horizontally. As VTOL aerial vehicles have grown in size and complexity, the power demands required for take-off and landings are increased.

SUMMARY

In one embodiment, an system disclosed herein may include: a vertical take-off and landing (VTOL) aerial vehicle; a first GPS antenna, the first GPS antenna disposed in a nose of the VTOL aerial vehicle; a second GPS antenna, the second GPS antenna disposed distal from the first GPS antenna; a GPS antenna switch; one or more aerial vehicle sensors; and an aerial vehicle flight controller comprising a processor having addressable memory, the flight controller in communication with the GPS antenna switch and the one or more aerial vehicle sensors, where the flight controller is configured to: utilize a GPS antenna signal via the GPS antenna switch from at least one of: the first GPS antenna and the second GPS antenna; receive a pitch level of the aerial vehicle from the one or more aerial vehicle sensors in at least one of: vertical flight and horizontal flight; determine if the received pitch level is at a set rotation from at least one of: vertical and horizontal; and utilize the GPS signal not being utilized via the GPS antenna switch if the determined pitch level is at or above the set rotation.

In additional system embodiments, an area between the first GPS antenna and an exterior surface of the nose may be substantially clear of any carbon-based or metallic material. In some embodiments, a first center field of view of the first GPS antenna may be oriented such that the first center field of view is substantially vertical when the VTOL aerial vehicle is in a nominal steady state hover attitude. In some embodiments, a first center field of view of the first GPS antenna is oriented such that the first center field of view is substantially vertical when the VTOL aerial vehicle is in a nominal steady state attitude for vertical flight. In some embodiments, the second GPS antenna may be disposed in a dorsal side of the VTOL aerial vehicle. In some embodiments, a second center field of view of the second GPS antenna may be oriented such that the second center field of view is substantially vertical when the VTOL aerial vehicle is in a nominal pitch attitude for horizontal flight.

In additional system embodiments, the flight controller may be further configured to: utilize a GPS antenna signal from the first GPS antenna in a vertical flight of the VTOL aerial vehicle via the GPS antenna switch. In some embodiments, the flight controller may be further configured to receive a pitch level of the aerial vehicle in the vertical flight from the one or more aerial vehicle sensors. In some embodiments, the flight controller may be further configured to: determine if the received pitch level is at a set rotation from vertical; and utilize the GPS signal from the second GPS antenna via the GPS antenna switch if the determined pitch level is at or above the set rotation from vertical. In some embodiments, the flight controller may be further configured to: receive a pitch level of the aerial vehicle in a horizontal flight from the one or more aerial vehicle sensors. In some embodiments, the flight controller may be further configured to: determine if the received pitch level is at a set rotation from horizontal; and utilize the GPS signal from the first GPS antenna via the GPS antenna switch if the determined pitch level is at or above the set rotation from horizontal.

In additional system embodiments, a first center field of view of the first GPS antenna may be substantially perpendicular to a second center field of view of the second GPS antenna. In some embodiments, the VTOL aerial vehicle may be an unmanned aerial vehicle (UAV). Additional system embodiments may include: a primary GPS receiver in communication with the flight controller; and a secondary GPS receiver in communication with the flight controller. In some embodiments, the flight controller may be further configured to: switch between the primary GPS receiver and the secondary GPS receiver based on at least one of: a signal quality of the primary GPS receiver, a signal quality of the secondary GPS receiver, a number of satellites in the visible constellation of the primary GPS receiver, and a number of satellites in the visible constellation of the secondary GPS receiver.

A method embodiment may include: utilizing, by an aerial vehicle flight controller comprising a processor having addressable memory, a GPS antenna signal from a first GPS antenna in a vertical flight of a vertical take-off and landing (VTOL) aerial vehicle via a GPS antenna switch; receiving, by the flight controller, a pitch level of the aerial vehicle in the vertical flight from one or more aerial vehicle sensors; determining, by the flight controller, if the received pitch level is at a set rotation from vertical; and utilizing, by the flight controller, the GPS signal from a second GPS antenna via the GPS antenna switch if the determined pitch level is at or above the set rotation from vertical. In some embodiments, the first GPS antenna may be disposed in a nose of the VTOL aerial vehicle, where the second GPS antenna may be disposed in a dorsal side of the VTOL aerial vehicle, where a first center field of view of the first GPS antenna may be oriented such that the first center field of view is substantially vertical when the VTOL aerial vehicle is in a nominal steady state hover attitude, and where a second center field of view of the second GPS antenna may be oriented such that the second center field of view is substantially vertical when the VTOL aerial vehicle is in a nominal pitch attitude for horizontal flight.

Additional method embodiments may include: receiving, by the flight controller, a pitch level of the aerial vehicle in a horizontal flight from the one or more aerial vehicle sensors; determining, by the flight controller, if the received pitch level is at a set rotation from horizontal; and utilizing, by the flight controller, the GPS signal from the first GPS antenna via the GPS antenna switch if the determined pitch level is at or above the set rotation from horizontal. Additional method embodiments may include: switching, by the flight controller, between a primary GPS receiver and a secondary GPS receiver based on at least one of: a signal quality of the primary GPS receiver, a signal quality of the secondary GPS receiver, a number of satellites in the visible constellation of the primary GPS receiver, and a number of satellites in the visible constellation of the secondary GPS receiver; where the primary GPS receiver is in communication with the flight controller, and where the secondary GPS receiver is in communication with the flight controller.

Another system embodiment may include: a vertical take-off and landing (VTOL) aerial vehicle; a first GPS antenna, the first GPS antenna disposed in a nose of the VTOL aerial vehicle, where an area between the first GPS antenna and an exterior surface of the nose is substantially clear of any carbon-based or metallic material, and where a first center field of view of the first GPS antenna is oriented such that the first center field of view is substantially vertical when the VTOL aerial vehicle is in at least one of: a nominal steady state hover attitude and a nominal steady state attitude for vertical flight; a second GPS antenna, the second GPS antenna disposed in a dorsal side of the VTOL aerial vehicle, where a second center field of view of the second GPS antenna is oriented such that the second center field of view is substantially vertical when the VTOL aerial vehicle is in a nominal pitch attitude for horizontal flight; a GPS antenna switch; one or more aerial vehicle sensors; and an aerial vehicle flight controller comprising a processor having addressable memory, the aerial vehicle flight controller in communication with the GPS antenna switch and the one or more aerial vehicle sensors, where the aerial vehicle flight controller is configured to: utilize a GPS antenna signal from the first GPS antenna in a vertical flight of the VTOL aerial vehicle via the GPS antenna switch; receive a pitch level of the aerial vehicle in the vertical flight from the one or more aerial vehicle sensors; determine if the received pitch level is at a set rotation from vertical; utilize the GPS signal from the second GPS antenna via the GPS antenna switch if the determined pitch level is at or above the set rotation from vertical; receive a pitch level of the aerial vehicle in a horizontal flight from the one or more aerial vehicle sensors; determine if the received pitch level is at a set rotation from horizontal; and utilize the GPS signal from the first GPS antenna via the GPS antenna switch if the determined pitch level is at or above the set rotation from horizontal.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
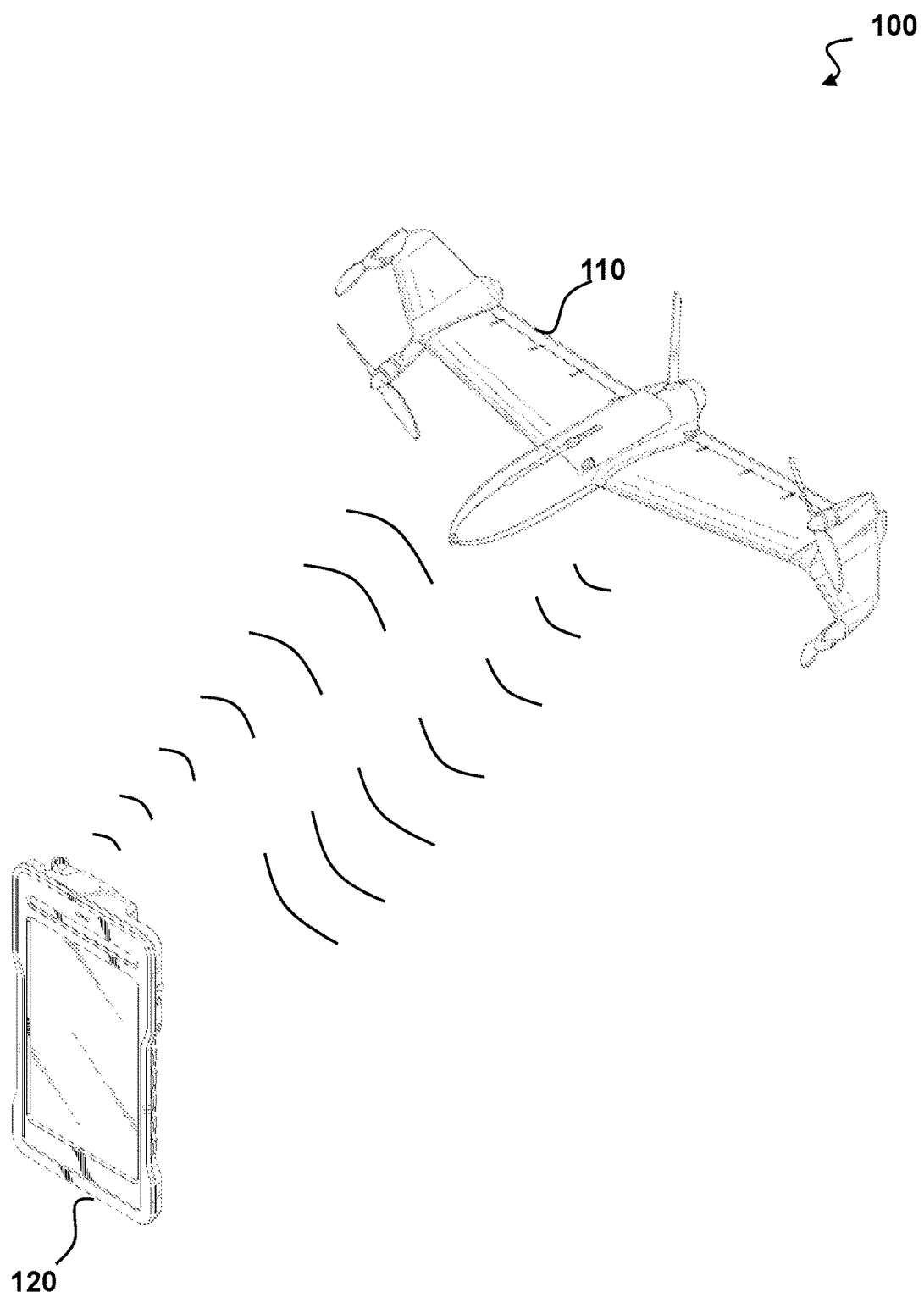
FIG. 1 depicts an air vehicle system having an air vehicle controlled by a ground control station, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The disclosed methods, systems, devices, and processes allow for the use of dual GPS antennas with vertical take-off and landing (VTOL) aerial vehicles. Due to the two primary orientations of a VTOL aerial vehicle in vertical flight or hovering and horizontal flight, a single GPS antenna may provide diminished accuracy in either orientation. For example, a GPS antenna positioned to maximize accuracy during horizontal flight may be inaccurate during take-off, landing, and vertical hovering. This inaccuracy may require a manual landing by a skilled operator, a far greater landing area, and increased risk of error or damage in vertical flight, or the like. The disclosed system and method allow for switching between dual GPS antennas, where each GPS antenna has a center field of view oriented in a distal direction so as to provide accuracy during both vertical and horizontal flight. The disclosed system and method allows for the switching between these dual GPS antennas to allow for an increased ability to receive GPS signals in different flight orientations, thereby making the flight process more refined and introduce fewer flight errors.

In a number of embodiments, the method includes orienting a vertical take-off and landing (VTOL) aerial vehicle for take-off in a first orientation, utilizing a first global positioning system (GPS) antenna signal in the VTOL aerial vehicle, increasing altitude of the VTOL aerial vehicle in the first orientation, transitioning the VTOL aerial vehicle to a second orientation, and switching from utilizing the first GPS antenna signal to utilizing a second GPS antenna signal in the VTOL aerial vehicle.

In another embodiment, the first orientation is a vertical orientation with respect to the ground, and the second orientation is horizontal with respect to the ground.

In a further embodiment, the switching further comprises crossfading the first GPS antenna signal with the second GPS antenna signal at a pre-determined switching point.

In many embodiments, the predetermined switching point is determined as an angle off center from the first orientation.

In a still further embodiment, the predetermined switching point is thirty degrees off center from the first orientation.

In yet another embodiment, the first GPS antenna is located in the nose of the aerial vehicle, and the second GPS antenna is located on the dorsal side of the aerial vehicle.

FIG. 1 depicts an air vehicle system 100 having an air vehicle 110 controlled by a ground control station 120, according to one embodiment. The air vehicle 100 is shown in FIG. 1 in a horizontal orientation, such as it would be positioned during forward flight. The ground control station 120 is in communication with the air vehicle 100. Operation of the motors can apply both forces and torque to the air vehicle 100. In many embodiments, the ground control station 120 may communicate with the air vehicle 110 to initiate a takeoff routine.

Figure 2:
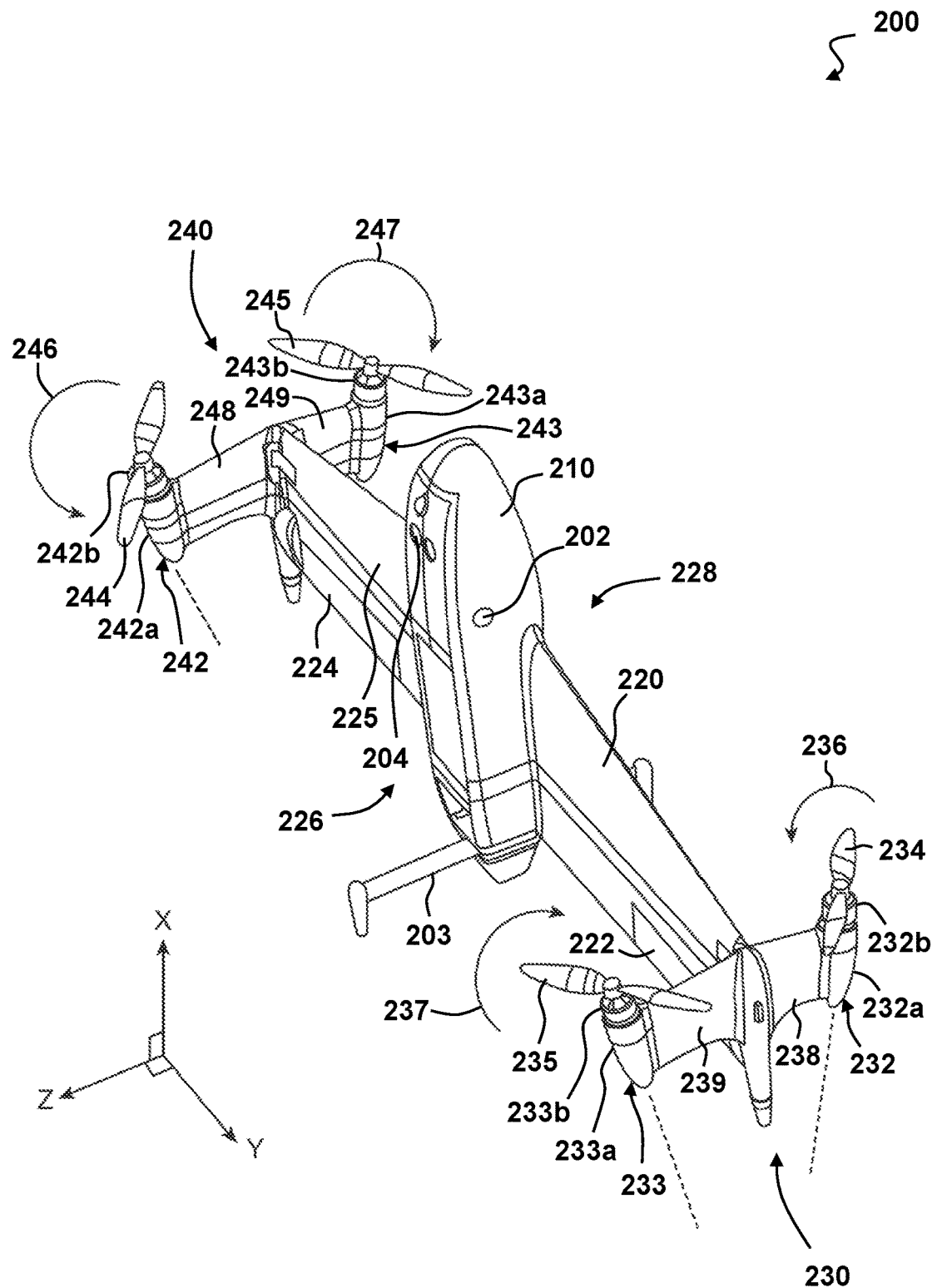
FIG. 2 depicts a perspective view of an embodiment of a vertical take-off and landing (VTOL) aerial vehicle, according to one embodiment.

FIG. 2 depicts a perspective view of an embodiment of a vertical take-off and landing (VTOL) aerial vehicle 200, according to one embodiment. The aerial vehicle 200 may be capable of vertical take-off and landing, hovering, vertical flight, maneuvering in a vertical orientation, transitioning between vertical and horizontal flight, and maneuvering in a horizontal orientation during forward flight. The aerial vehicle 200 may be controlled by an on-board control system that adjusts thrust to each of the motors 232b, 233b, 242b, 243b and control surfaces 222, 224. The on-board control system may include a processor having addressable memory and may apply differential thrust of the motors 232b, 233b, 242b, 243b to apply both forces and torque to the aerial vehicle 200.

The aerial vehicle 200 includes a fuselage 210 and a wing 220 extending from both sides of the fuselage 210. The wing 220 may include control surfaces 222, 224 positioned on either side of the fuselage 210. In some embodiments, the wing 220 may not include any control surfaces to reduce weight and complexity. A top side or first side 228 of the wing 220 may be oriented upwards relative to the ground during horizontal flight. A bottom side or second side 226 of the wing 220 may be oriented downwards relative to the ground during horizontal flight. The wing 220 is positioned in and/or about a wing plane 225. The wing plane 225 may be parallel to an x-y plane defined by the x-y-z coordinate system as shown in FIG. 2, where the x-direction is towards a longitudinal axis of aerial vehicle 200 and the y-direction is towards a direction out along the wing 220. The wing 220 may generally lie and/or align to the wing plane 225. In some embodiments, the wing 220 may define or otherwise have a platform of the wing that defines a plane that the wing is positioned at least symmetrically about.

One or more sensors 204 may be disposed in the fuselage 210 of the aerial vehicle 200 on the second side 226 to capture data during horizontal forward flight. The sensor 204 may be a camera, and any images captured during flight of the aerial vehicle 200 may be stored and/or transmitted to an external device. The sensor 204 may be fixed or gimbaled relative to the fuselage 210 of the aerial vehicle 200. In some embodiments, the sensors 204 may be swapped based on the needs of a mission, such as replacing a LIDAR with an infrared camera. In a number of embodiments, the sensors 204 may be capable of acquiring data that allows for a three-hundred sixty-degree view of the surroundings of the aerial vehicle 200.

The aerial vehicle 200 is depicted in a vertical orientation, as it would be positioned on the ground prior to take-off or after landing. Landing gear 203 may maintain the aerial vehicle 200 in this vertical orientation. In some embodiments, the landing gear 203 may act as a vertical stabilizer during horizontal forward flight of the aerial vehicle 200. In additional embodiments, no vertical stabilizers are present. In further embodiments, landing gear struts and/or ground contact points may be positioned anywhere along the span of the wing. In still further embodiments, contact points at the end of the motor pod on each pylon may eliminate the need for a dedicated landing gear strut. In still additional embodiments, the landing gear strut is retractable, facilitating a reduction in drag and surface area exposed to crosswinds that may result in increased performance.

A first motor assembly 230 is disposed at a first end or tip of the wing 220 distal from the fuselage 210. The first motor assembly 230 includes a pair of motor pods 232, 233 including pod structures 232a, 233a and motors 232b, 233b; winglets 238, 239; and propellers 234, 235. A top port motor pod 232 may include a top port pod structure 232a supporting a top port motor 232b. A rotor or propeller 234 may be driven by the top port motor 232b to provide thrust for the aerial vehicle 200. The top port motor pod 232 may be disposed on the first side 228 of the wing 220 and may be separated from the first end of the wing 220 by a pylon 238. The motor 232b applies a moment or torque on the propeller 234 to rotate it and in so doing applies an opposing moment or torque 236 on the aerial vehicle 200. The opposing moment 236 acts to rotate or urge the aerial vehicle 200 to rotate about an axis or axes 202. The moment 236 may change in conjunction with the speed of the propeller 234 and as the propeller 234 is accelerated or decelerated. The propeller 234 may be a fixed or variable pitch propeller.

The angling of the axis of rotation of the motor 232b and propeller 234 from the vertical, but aligned with the plane of the winglet 238 and/or with a plane perpendicular to the wing plane 225, provides for a component of the thrust generated by the operation of the propeller 234 to be vertical, in the x-direction, and another component of the thrust to be perpendicular to the wing 220, in the negative z-direction. This perpendicular component of the thrust may act upon a moment arm along the wing 220 to the an axis or axes 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 234 that is displaced a distance from the an axis or axes 202 of the aircraft 200, such as to apply a moment to the aerial vehicle 200 to cause, or at least urge, the aerial vehicle 200 to pitch about an axis or axes 202. This pitching may cause, or at least facilitate, the transition of aerial vehicle 200 from vertical flight to horizontal flight, and from horizontal flight to vertical flight.

A bottom port motor pod 233 may include a bottom port pod structure 233a supporting a bottom port motor 233b. The bottom port motor 233b is disposed on the second side 226 of the wing 220 opposing the top port motor 232b. A rotor or propeller 235 may be driven by the bottom port motor 233b to provide thrust for the aerial vehicle 200. The bottom port motor pod 233 may be disposed on the second side 226 of the wing 220 and may be separated from the first end of the wing 220 by a pylon 239.

The motor 233b applies a moment or torque on the propeller 235 to rotate it and in so doing applies an opposing moment or torque 237 on the aerial vehicle 200. The opposing moment 237 acts to rotate or urge the aerial vehicle 200 to rotate about an axis or axes 202. The moment 237 may change in conjunction with the speed of the propeller 235 and as the propeller 235 is accelerated or decelerated. The propeller 235 may be a fixed or variable pitch propeller.

The motor pod 233, the motor 233b, and the propeller 235 may all be aligned to be angled down in the direction of the second side 226 of the wing 220, down from the x-y plane in the z-direction, from the vertical while being within a plane of the winglet 239, such that any force, and force components thereof, generated by the propeller 235 shall align, and/or be within, the plane of the winglet 239, such that lateral forces to the plane of the winglet 239 are minimized or not generated. The alignment of the motor 233b and the propeller 235 may be a co-axial alignment of their respective axes of rotation.

The angle that the motor 233b and propeller 235 axes are from the vertical, x-direction may vary from 0 to 45 degrees. In one exemplary embodiment, the angle may be about 10 degrees from vertical. The angle of the motor 233b and propeller 235 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 233b and propeller 235 from the vertical, but aligned with the plane of the pylon 239 and/or with the plane perpendicular to the wing plane 225, provides for a component of the thrust generated by the operation of the propeller 235 to be vertical, in the x-direction, and another component of the thrust to be perpendicular to the wing 220, in the z-direction. This perpendicular component of the thrust may act upon a moment arm along the wing 220 to the an axis or axes 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 235 that is displaced a distance from the an axis or axes 202 of the aircraft 200, such as to apply a moment to the aerial vehicle 200 to cause, or at least urge, the aerial vehicle 200 to pitch about an axis or axes 202. This pitching may cause, or at least facilitate, the transition of aerial vehicle 200 from vertical flight to horizontal flight, and from horizontal flight to vertical flight.

A second motor assembly 240 is disposed at a second end or tip of the wing 220 distal from the fuselage 210 and distal from the first motor assembly 230. The second motor assembly 240 includes a pair of motor pods 242, 243 including pod structures 242a, 243a and motors 242b, 243b; winglets 248, 249; and propellers 244, 245. A top starboard motor pod 243 may include a top starboard pod structure 243a supporting a top starboard motor 243b. A rotor or propeller 245 may be driven by the top starboard motor 243b to provide thrust for the aerial vehicle 200. The top starboard motor pod 243 may be disposed on the first side 228 of the wing 220 and may be separated from the second end of the wing 220 by a pylon 249. The motor 243b applies a moment or torque on the propeller 245 to rotate it and in so doing applies an opposing moment or torque 247 on the aerial vehicle 200. The opposing moment 247 acts to rotate or urge the aerial vehicle 200 to rotate about an axis or axes 202. The moment 247 may change in conjunction with the speed of the propeller 245 and as the propeller 245 is accelerated or decelerated. The propeller 245 may be a fixed or variable pitch propeller.

The motor pod 243, the motor 243b, and the propeller 245 may all be aligned to be angled up in the direction of the first side 228 of the wing 220, up from the x-y plane in the negative z-direction, from the vertical while being within a plane of the winglet 249, such that any force, and force components thereof, generated by the propeller 247 shall align, and/or be within, the plane of the winglet 249, such that lateral forces to the plane of the winglet 249 are minimized or not generated. The alignment of the motor 243b and the propeller 245 may be a co-axial alignment of their respective axes of rotation.

The angle that the motor 243b and propeller 245 axes are from the vertical, x-direction may vary from 5 to 35 degrees. In one exemplary embodiment, the angle may be about 10 degrees from vertical. The angle of the motor 243b and propeller 245 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 243b and propeller 245 from the vertical, but aligned with the plane of the winglet 249 and/or with the plane perpendicular to the wing plane 225, provides for a component of the thrust generated by the operation of the propeller 245 to be vertical, in the x-direction, and another component of the thrust to be perpendicular to the wing 220, in the negative z-direction. This perpendicular component of the thrust may act upon a moment arm along the wing 220 to the an axis or axes 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 245 that is displaced a distance from the an axis or axes 202 of the aircraft 200, such as to apply a moment to the aerial vehicle 200 to cause, or at least urge, the aerial vehicle 200 to pitch about an axis or axes 202. This pitching may cause, or at least facilitate, the transition of aerial vehicle 200 from vertical flight to horizontal flight, and from horizontal flight to vertical flight.

A bottom starboard motor pod 242 may include a bottom starboard pod structure 242a supporting a bottom starboard motor 242b. The bottom starboard motor 242b is disposed on the second side 226 of the wing 220 opposing the top starboard motor 243b. A rotor or propeller 244 may be driven by the bottom starboard motor 242b to provide thrust for the aerial vehicle 200. The bottom starboard motor pod 242 may be disposed on the second side 226 of the wing 220 and may be separated from the second end of the wing 220 by a pylon 248.

The motor pod 242, the motor 242b, and the propeller 244 may all be aligned to be angled down in the direction of the second side 226 of the wing 220, down from the x-y plane in the z-direction, from the vertical while being within a plane of the winglet 248, such that any force, and force components thereof, generated by the propeller 244 shall align, and/or be within, the plane of the winglet 248, such that lateral forces to the plane of the winglet 248 are minimized or not generated. The alignment of the motor 242b and the propeller 244 may be a co-axial alignment of their respective axes of rotation.

The angle that the motor 242b and propeller 244 axes are from the vertical, x-direction may vary from 5 to 35 degrees. In one exemplary embodiment, the angle may be about 10 degrees from vertical. The angle of the motor 242b and propeller 244 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The motor 242b applies a moment or torque on the propeller 244 to rotate it and in so doing applies an opposing moment or torque 246 on the aerial vehicle 200. The opposing moment 246 acts to rotate or urge the aerial vehicle 200 to rotate about an axis or axes 202. The moment 246 may change in conjunction with the speed of the propeller 244 and as the propeller 244 is accelerated or decelerated. The propeller 244 may be a fixed or variable pitch propeller.

The angling of the axis of rotation of the motor 242b and propeller 244 from the vertical, but aligned with the plane of the winglet 248 and/or with the plane perpendicular to the wing plane 225, provides for a component of the thrust generated by the operation of the propeller 244 to be vertical, in the x-direction, and another component of the thrust to be perpendicular to the wing 220, in the z-direction. This perpendicular component of the thrust may act upon a moment arm along the wing 220 to an axis or axes 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 244 that is displaced a distance from an axis or axes 202 of the aircraft 200, such as to apply a moment to the aerial vehicle 200 to cause, or at least urge, the aerial vehicle 200 to pitch about an axis or axes 202. This pitching may cause, or at least facilitate, the transition of aerial vehicle 200 from vertical flight to horizontal flight, and from horizontal flight to vertical flight.

The motors 232b, 233b, 242b, 243b operate such that variations in the thrust or rotation for fixed pitched rotors, and resulting torque or moment of pairs of the motors can create a resulting moment applied to the aerial vehicle 200 to move it in a controlled manner. Because of the angling off of the aircraft longitudinal centerline, vertical in hover and horizontal in forward horizontal flight, of each of the motors 232b, 233b, 242b, 243b, in addition to the moment imparted by the differential of the operation of the motors 232b, 233b, 242b, 243b a complementary force component is generated and applied to the aerial vehicle 200 to move it in the same manner.

Increasing thrust to the top two motors 232b, 243b, and decreasing thrust to the bottom two motors 233b, 242b in horizontal flight will cause the aerial vehicle 200 to pitch down. Decreasing thrust to the top two motors 232b, 243b, and increasing thrust to bottom two motors 233b, 242b in horizontal flight will cause the aerial vehicle 200 to pitch up. A differential between the thrust of the top two motors 232b, 243b and the bottom two motors 233b, 242b may be used to control the pitch of the aerial vehicle 200 during horizontal flight. In some embodiments, control surfaces 222, 224 on the wing 220 may also be used to supplement pitch control of the aerial vehicle 200. The separation of the top and bottom motors by their respective winglets is needed to create the pitch moment of the aerial vehicle 200.

Increasing thrust to the top port motor 232b and bottom starboard motor 242b, and decreasing thrust to the top starboard motor 243b and bottom port motor 233b in horizontal flight will cause the aerial vehicle 200 to roll clockwise relative to a rear view of the aerial vehicle 200. Decreasing thrust to top port motor 232b and bottom starboard motor 242b, and increasing thrust to the top starboard motor 243b and bottom port motor 233b in horizontal flight will cause the aerial vehicle 200 to roll counter-clockwise relative to a rear view of the aerial vehicle 200. A differential between the thrust of the top port and bottom starboard motors and the top starboard and bottom port motors may be used to control roll of the aerial vehicle 200 during horizontal flight. In some embodiments, control surfaces 222, 224 on the wing 220 may also be used to supplement roll control of the aerial vehicle 200.

Increasing thrust to both port motors 232b, 233b and decreasing thrust to both starboard motors 242b, 243b in horizontal flight will cause the aerial vehicle 200 to yaw towards starboard. Decreasing thrust to both port motors 232b, 233b and increasing thrust to both starboard motors 242b, 243b in horizontal flight will cause the aerial vehicle 200 to yaw towards port. A differential between the thrust of the top and bottom starboard motors 242b, 243b and the top and bottom port motors 232b, 233b may be used to control yaw of the aerial vehicle 200 during horizontal flight.

Figure 3:
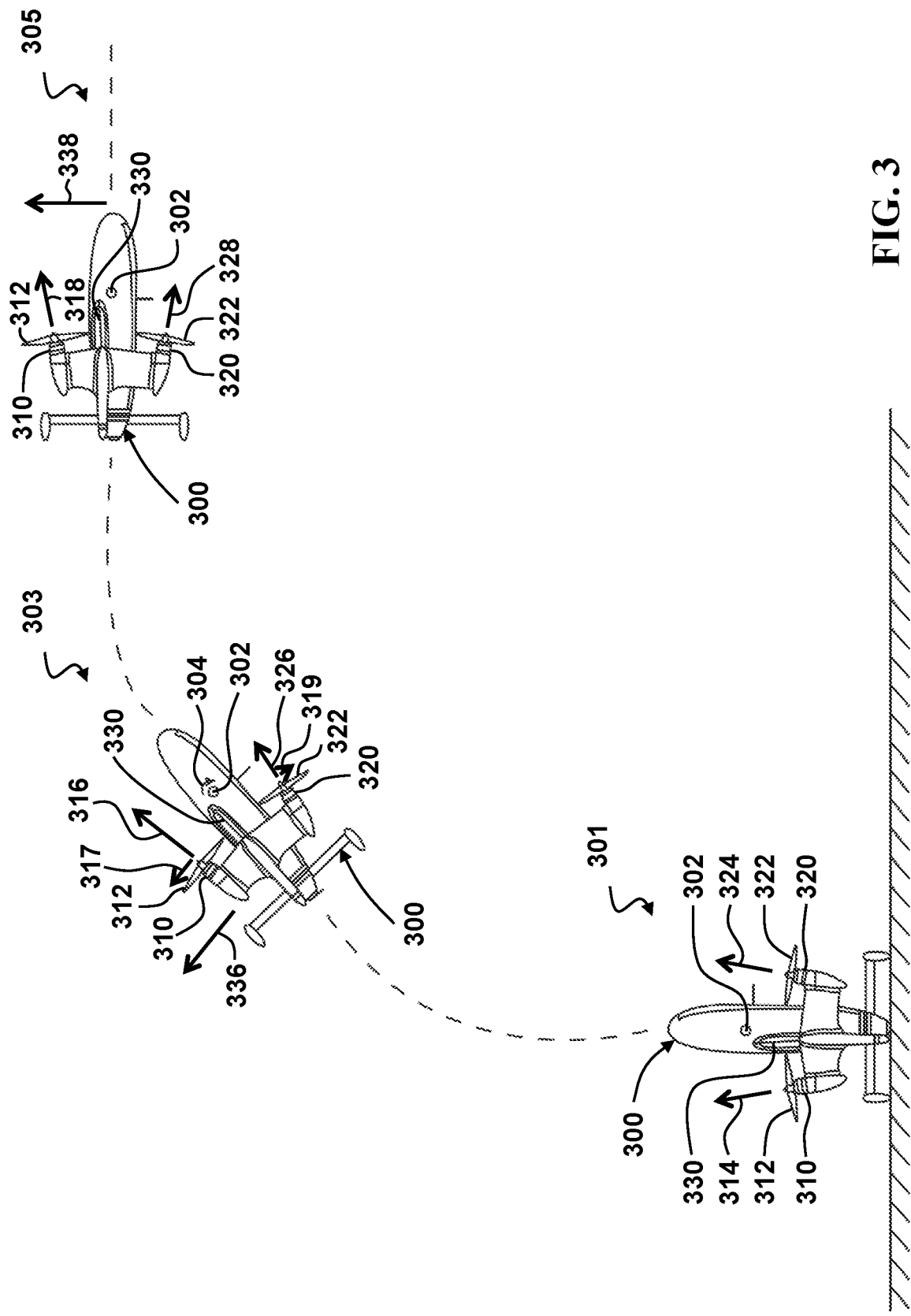
FIG. 3 depicts a VTOL aerial vehicle transitioning from vertical flight to horizontal flight by varying the thrust produced by its motors, according to one embodiment.

FIG. 3 depicts an exemplary VTOL aerial vehicle 300 transitioning from vertical flight to horizontal flight by varying the thrust produced by its motors, according to one embodiment. The aerial vehicle 300 is in a first position 301 on the ground ready for vertical take-off. A top motor 310 connected to a top propeller 312 is angled outward from vertical and away from a wing 330. A bottom motor 320 connected to a bottom propeller 322 is angled outward from vertical and away from the wing 330. The top motor 310 and bottom motor 320 are positioned at an end of the wing 330 of the aerial vehicle 300 and may be separated from the wing 330 by a pylon. Additional top and bottom motors and corresponding propellers may be present behind the top motor 310 and bottom motor 320 and positioned on the opposing end of the wing 330, such as shown in FIG. 2.

An on-board controller having a processor and addressable memory may send a signal to the motors to produce thrust needed for vertical take-off and subsequent adjustments to thrust during flight. Flight control may be autonomous, pre-programmed, and/or controlled by an external user at a ground control system. Top motors 310 create top thrust 314, and bottom motors create bottom thrust 324. During vertical take-off, the top thrust 314 and bottom thrust 324 may be substantially equal. The top thrust 314 and the bottom thrust 324 are depicted as angled based on the angles of the respective motors 310, 320 and propellers 312, 322 to have both a vertical and a lateral component.

The aerial vehicle 300 is in a second position 303 transitioning from vertical flight to horizontal flight. The aerial vehicle 300 pitches forward by increasing a top thrust 316 produced by the top motor 310 and decreasing a bottom thrust 326 produced by the bottom motor 320. This thrust differential produces a net moment 304 about a center of mass 302 of the aerial vehicle 300, which causes the aerial vehicle 300 to pitch forward. The component of the top thrust 316 in the lateral direction 317 is greater than the opposing lateral thrust 319 from the bottom thrust 326, and the lateral thrust 317 adds to the lift 336 created by the wing 330.

The aerial vehicle 300 is in a third position 305 in forward horizontal flight. The wing lift 338 is carrying the weight of the aerial vehicle 300. As the top thrust 318 and bottom thrust 328 are adjusted, the aerial vehicle 300 may be pitched up or down. Adjusting thrust to the motors on the opposing end of the wing 330 of the aerial vehicle 300 may allow the aerial vehicle 300 to be yawed left or right by differential thrust between the right and left sides.

In certain embodiments, there are separate controllers being utilized by the aerial vehicle 300 between the first position 301 and the third position 305. In many embodiments, the ailerons and differential motors of the aerial vehicle 300 are utilized in the third position 305. In further embodiments, the ailerons control the roll and pitch of the aerial vehicle 300 while the differential motors control the yaw of the aerial vehicle 300 in the third position 305. In additional embodiments, only the differential motors are utilized for control of the aerial vehicle 300 in the first position 301. In still additional embodiments, control of the aerial vehicle 300 is transitioned from a first set of controls in the first position 301 to a second set of controls in the third position 305 during the transition of the second position 303. In still further embodiments, the transition between controls of the first position 301 and the third position 305 is accomplished via a fading method. In still yet further embodiments, a series of health checks are performed during the second position 303 to evaluate the transition. By way of example, but not limitation, when the controls of the third position are not found or fail, the transition may be cancelled and/or the controls from the first position 301 may be utilized.

Figure 4A:
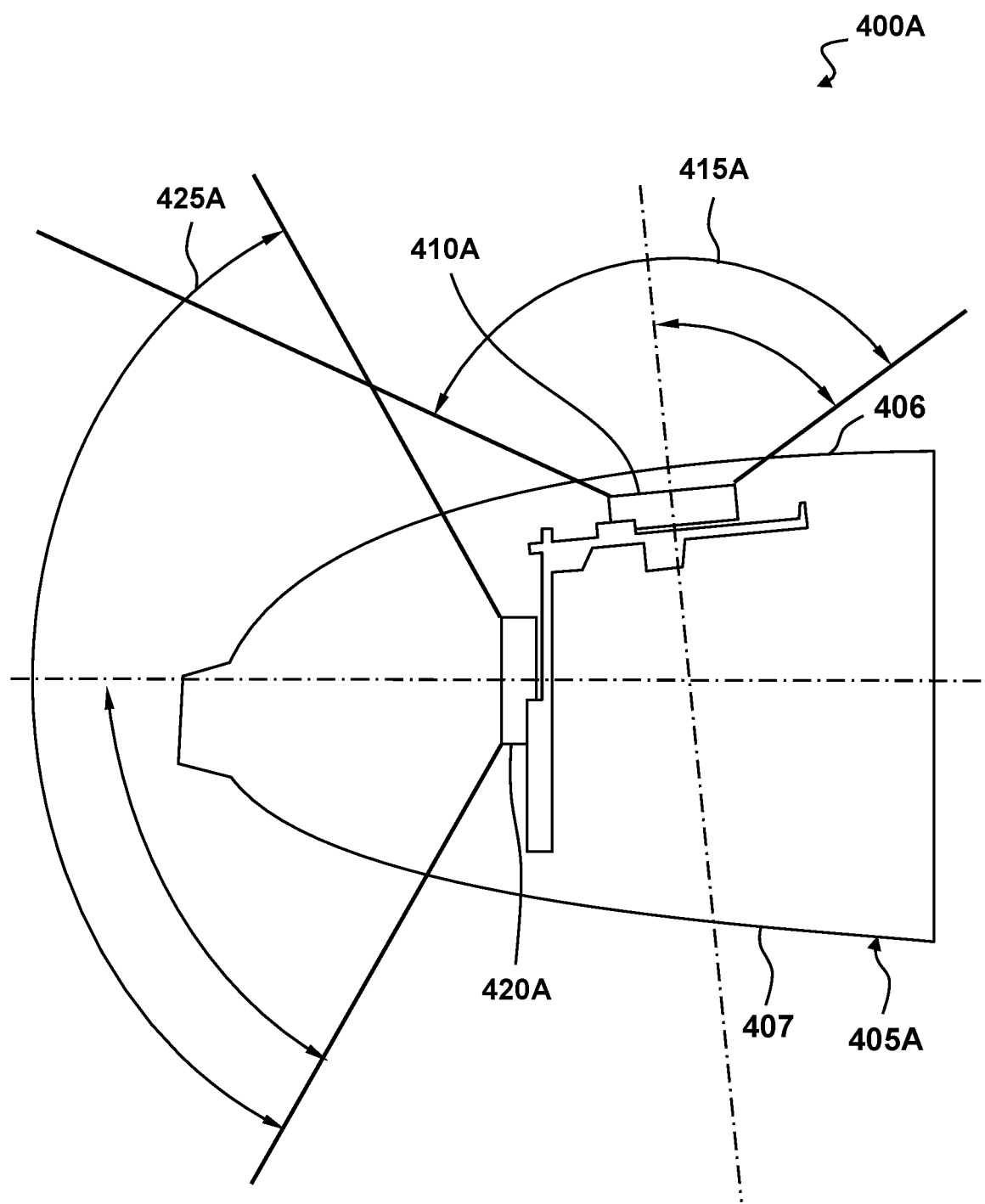
FIG. 4A depicts a partially transparent side view of an anterior portion of an aerial vehicle fuselage, according to one embodiment.

FIG. 4A depicts a partially transparent side view 400A of an anterior portion of an aerial vehicle fuselage 405A, according to one embodiment. In many embodiments, the aerial vehicle fuselage 405A may contain a first global positioning system (GPS) antenna 410A and a second GPS antenna 420A. In certain embodiments, the first GPS antenna 410A may be located on a dorsal side 406 of the aerial vehicle fuselage 405A. An area between the second GPS antenna 420A and an exterior surface of the aerial vehicle fuselage 405A may be substantially clear of any carbon-based or metallic material that may impact a signal strength of the second GPS antenna 420A. In certain further embodiments, the first GPS antenna 410A may be covered by a fiberglass or any other suitable transparent and/or nonmetallic material in order to facilitate better GPS signal reception. The disclosed system may be substantially clear of any carbon-based or metallic material disposed between the first GPS antenna 410A and an exterior surface 407 of the aerial vehicle fuselage 405A. In further embodiments, the placement of the first GPS antenna 410A and/or second GPS antenna 420A may be based upon a desired center of gravity of the aerial vehicle.

In additional embodiments, the first GPS antenna 410A may be positioned such that a first wide signal reception angle 415A is present. Similarly, in additional further embodiments, the second GPS antenna 420A may be positioned such that a second wide signal reception angle 425A is present. In still additional embodiments, the first wide reception angle 415A and/or the second wide reception angle 425A may have a one-hundred and twenty degree angle of GPS signal field of view as measured from the respective edges of each antenna element. In further additional embodiments, each GPS antenna 410A, 420A, may each have their own unique tuning. As those skilled in the art would appreciate, the exact placement of the first and second GPS antennas may be varied based on the shape of the aerial vehicle fuselage 405A and the desired applications. By way of example, and not limitation, a single antenna part may be utilized at each of the two GPS antenna locations in order to lower part numbers and potential manufacturing and user mistakes in part installation and/or replacement. In many embodiments, the aerial vehicle may include an inertial measurement unit (IMU) that may contain a plurality of gyroscopes. In further additional embodiments, the plurality of IMU gyroscopes may measure the pitch angle of the aerial vehicle and generate a signal based on that pitch angle. This signal may be utilized by the disclosed system to switch between the dual GPS antennas 410A, 420A.

Figure 4B:
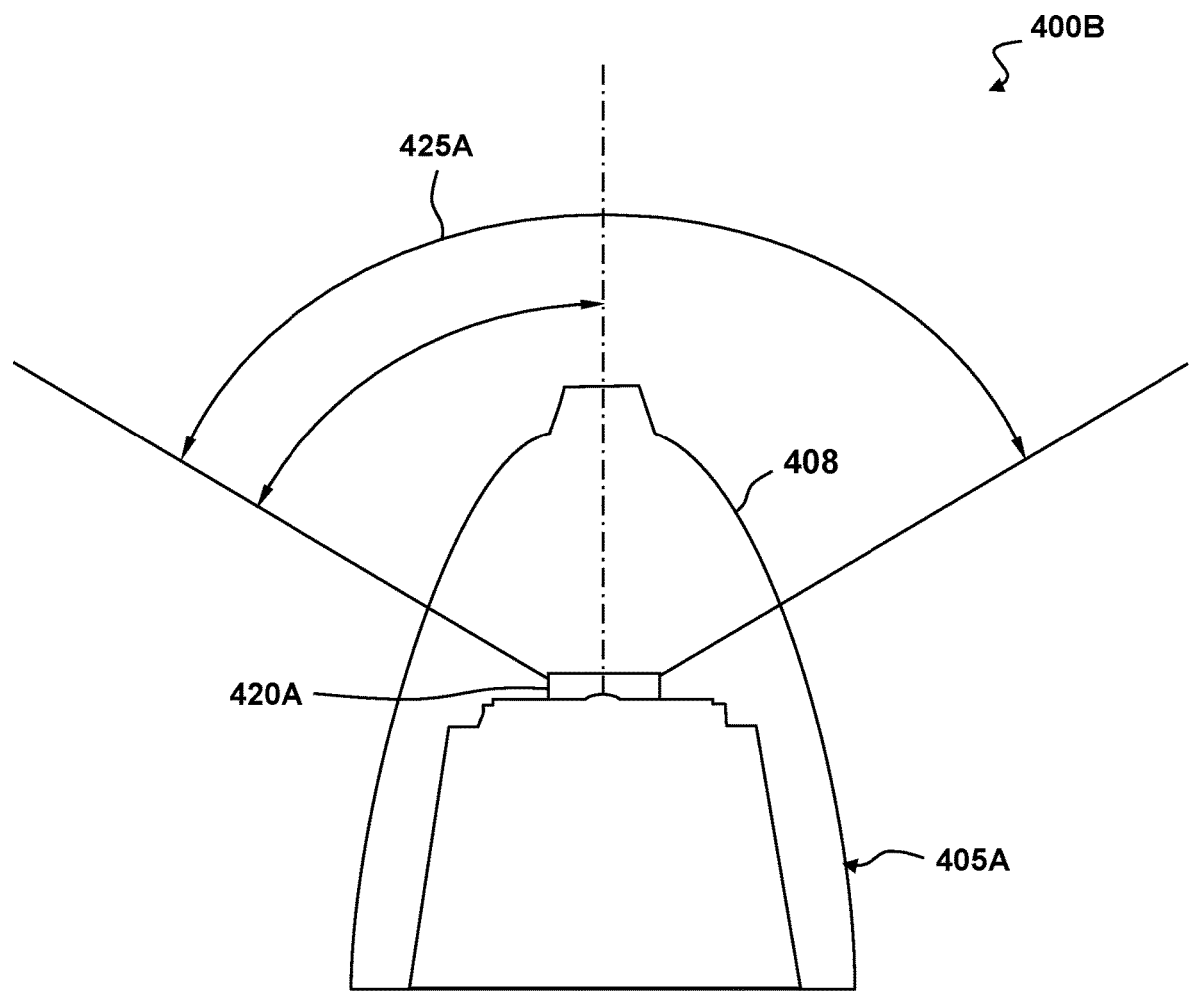
FIG. 4B depicts a partially transparent top view of a nose of the aerial vehicle of FIG. 4A showing the second GPS antenna, according to one embodiment.

FIG. 4B depicts a partially transparent top view 400B of a nose 408 of the aerial vehicle 405A of FIG. 4A showing the second GPS antenna 420A, according to one embodiment. In many embodiments, the second GPS antenna 420A may be fixed behind the nose 408 of the aerial vehicle 405A. In a number of embodiments, the second GPS antenna 420A may be placed approximately six to twelve inches behind the tip of the nose 408. In certain embodiments, the placement of the second GPS antenna 420A allows for a one-hundred and twenty degree GPS field of view angle 425A as measured from the edges of the antenna element. In certain further embodiments, the field of view of the second GPS antenna 420A may emanate from the edges of the GPS antenna 420A element in order ensure no obstructions are present. In additional embodiments, the second GPS antenna 420A may be utilized in a VTOL aerial vehicle in the upright position utilized in take-off and landings.

Figure 4C:
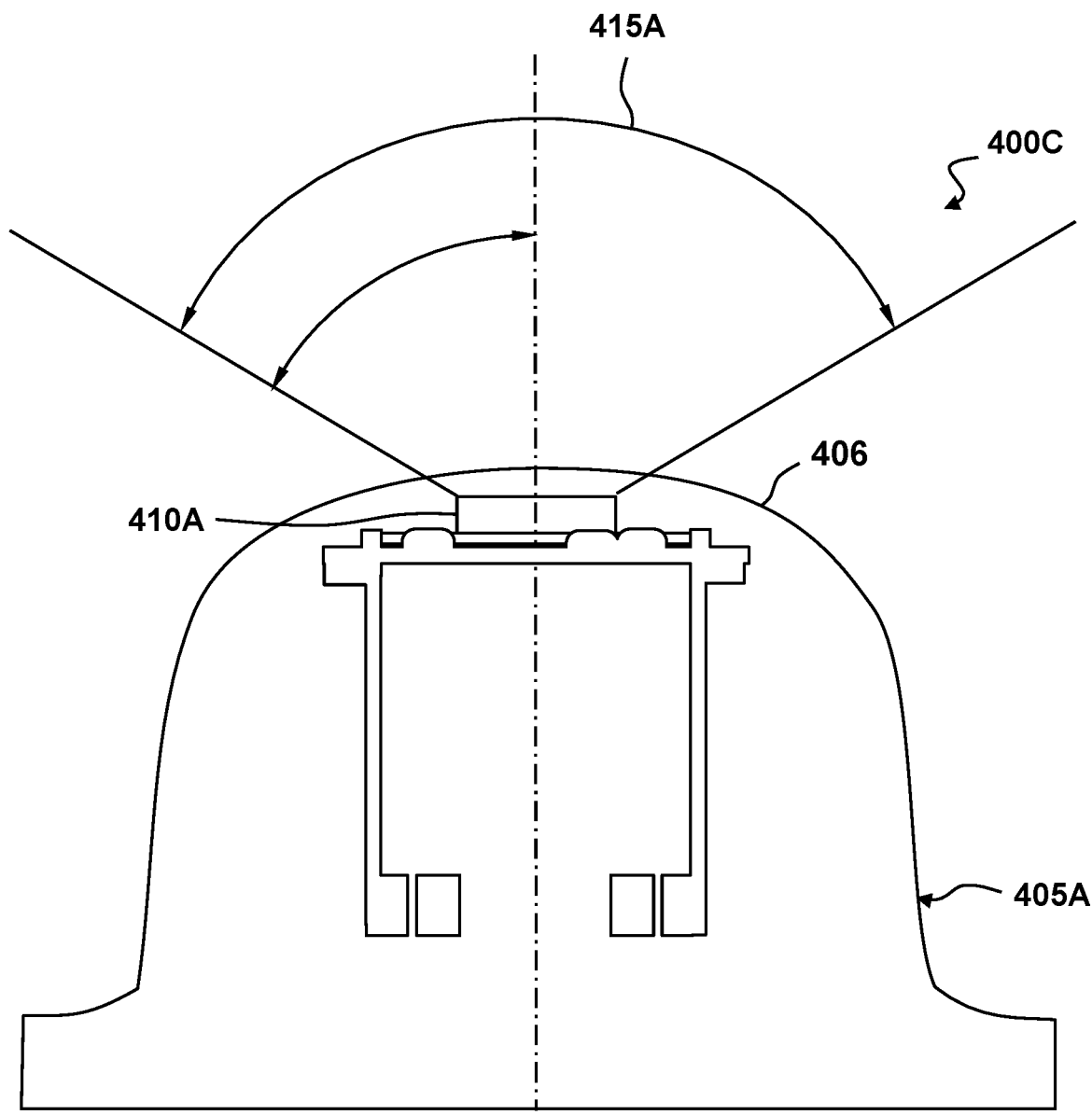
FIG. 4C depicts a partially transparent front view of the aerial vehicle of FIG. 4A showing the second antenna, according to one embodiment.

FIG. 4C depicts a partially transparent front view 400C of the aerial vehicle 405A of FIG. 4A showing the first GPS antenna 410A, according to one embodiment. In many embodiments, the aerial vehicle may have the first GPS antenna 410A fixed to the dorsal side 406 of the aerial vehicle 405A. In a number of embodiments, VTOL aerial vehicles may utilize the first GPS antenna 410A when in horizontal flight mode. In additional embodiments, the first GPS antenna 410A may be placed within the fuselage of the aerial vehicle 405C such that a GPS reception angle 415A of approximately one-hundred and twenty degrees is formed. In certain further embodiments, the field of view of the first GPS antenna 410A may emanate from the edges of the first GPS antenna 410A element.

Figure 5:
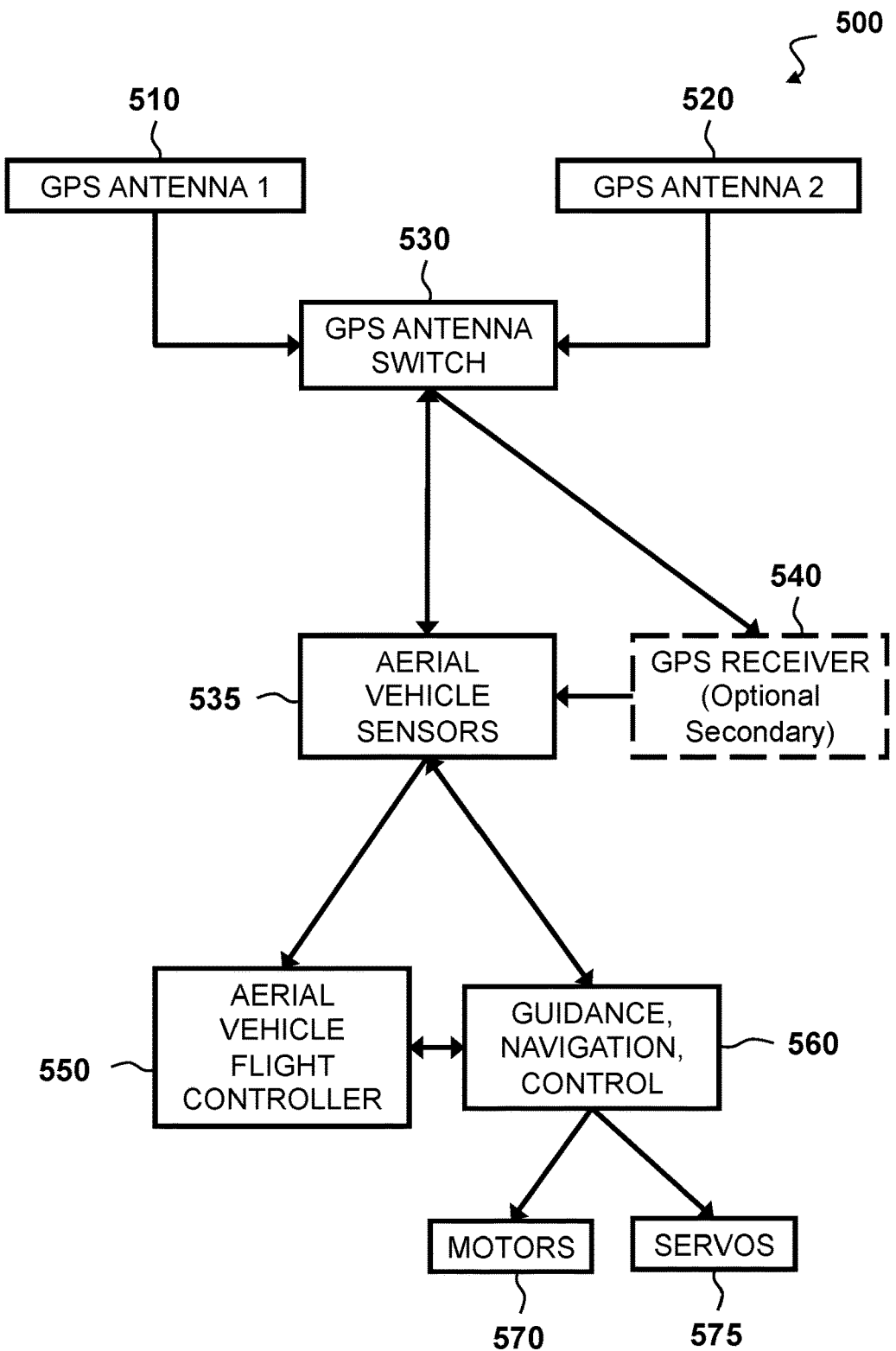
FIG. 5 depicts a high-level block-diagram for a dual GPS antenna system, according to one embodiment.

FIG. 5 depicts a high-level block-diagram for a dual GPS antenna system 500, according to one embodiment. The dual GPS system 500 may contain a first GPS antenna 510 and a second GPS antenna 520. In a number of embodiments, each of the GPS antenna signals may be routed into a GPS antenna switch 530. In certain embodiments, the GPS antenna switch 530 may provide only a single GPS antenna signal to a secondary GPS receiver 540 and/or a primary GPS receiver included in an aerial vehicle sensor suite 535. In certain additional embodiments, the GPS antenna switch 530 may blend or crossfade the signals from the first GPS antenna 510 and the second GPS antenna 520. In some embodiments, a primary GPS receiver may be in the vehicle sensor suite 535 and a second GPS receiver 540 may be used such that the system may switch between the primary GPS receiver and the secondary GPS receiver based on the signal strength of each GPS receiver.

In many embodiments, the one or more aerial vehicle sensors 535 may send signals to the GPS antenna switch 530 that may affect the switching parameters of the GPS antenna switch 530. In additional embodiments, the aerial vehicle sensors 535 may include, but are not limited to, a primary GPS receiver, one or more gyroscopes, one or more accelerometers, one or more barometers, one or more pivot-static systems, and/or one or more magnetic sensors. In still additional embodiments, the orientation of the aerial vehicle and the pitch angle from a starting orientation may determine the GPS antenna signal selected by the GPS antenna switch 530. In still yet additional embodiments, a pitch angle of sixty degrees from a starting orientation may trigger a switch between GPS antenna signals.

In yet further additional embodiments, the GPS antenna switch 530 may enact a crossfade between the two GPS antenna signals based upon the relative pitch angle of the aerial vehicle. In certain additional embodiments, the crossfade may be done over a pitch angle change of thirty degrees, where one GPS antenna signal is crossfaded into the other relative to the amount of pitch angle change, with a full crossfade occurring after a change of thirty degrees.

In further additional embodiments, the GPS antenna switch 530 may select a GPS antenna signal based upon which GPS antenna 510, 520 has a stronger signal. In certain additional embodiments, the GPS antenna signals may need to meet a pre-determined minimum threshold before being utilized by the GPS antenna switch 530. As those skilled in the art would recognize, the amount of pitch angle change needed for a proper crossfade and/or for a hard switch between GPS antenna signals may vary depending on the shape of the aerial vehicle or the nature of the applications desired.

In many embodiments, a secondary GPS receiver 540 may be utilized by the aerial vehicle dual GPS system 500 in order to supplement the GPS capabilities of an aerial vehicle flight controller 550. In certain embodiments, the secondary GPS receiver 540 may be installed on the aerial vehicle flight controller 550 via a header connection. When a secondary GPS receiver 540 is present, the GPS antenna switch 530 may feed the switched GPS signal into the GPS receiver 540. Alternatively, the GPS antenna switch 530 may feed the switched GPS signal directly into the aerial vehicle sensors 535. The aerial vehicle flight controller 550 may have a processor having addressable memory to execute the one or more GPS antenna switches based on an orientation and/or signal strength determined by the aerial vehicle sensors 535 and/or the secondary GPS receiver 540.

In further additional embodiments, the aerial vehicle sensors 535 may include an internal navigation system (INS) that itself may include an inertial measurement unit (IMU) that can provide the GPS antenna switch 530 with data necessary to facilitate a switch between antennas such as, but not limited to, aerial vehicle attitudes and/or angles. In a number of embodiments, the aerial vehicle flight controller 550 may be a programmable logic controller having a processor and addressable memory. In further embodiments, the aerial vehicle flight controller 550 may be in communication with a guidance, navigation, and control (GNC) 560 system that may then issue signals to the various control effectors needed to maneuver the aerial vehicle including, but not limited to motors 570 and/or servos 575.

The air vehicle sensors 535 may include a primary GPS receiver integrated into the core avionics suite. When the auxiliary GPS receiver 540 is utilized, the system may switch between the two sources based on signal quality, i.e., signal to noise ratio (SNR), and the number of satellites in the visible constellation. For example, SNR and satellite constellation of both receivers may be monitored during flight with the system utilizing the GPS receiver 535, 540 having the ideal combination of signal to noise ratio and number of satellites. In one embodiment, if a number of satellites drops below four, then the receivers 535, 540 may be switched. In another embodiment, if SNR drops below 40 and SNR for the alternate source is higher, the receivers 535, 540 may be switched.

When utilizing only the primary GPS receiver 535, and signal quality using the selected GPS antenna 510, 520 is below a defined threshold, the system may switch to the alternate GPS antenna 510, 520. This switching between GPS antennas 510, 520 may occur in the event of a component failure, antenna orientation relative to the satellite constellation, i.e., higher latitudes where the constellation may be concentrated on the horizon, and/or antenna obscuration due to surrounding obstacles, such as trees, buildings, and the like.

Figure 6:
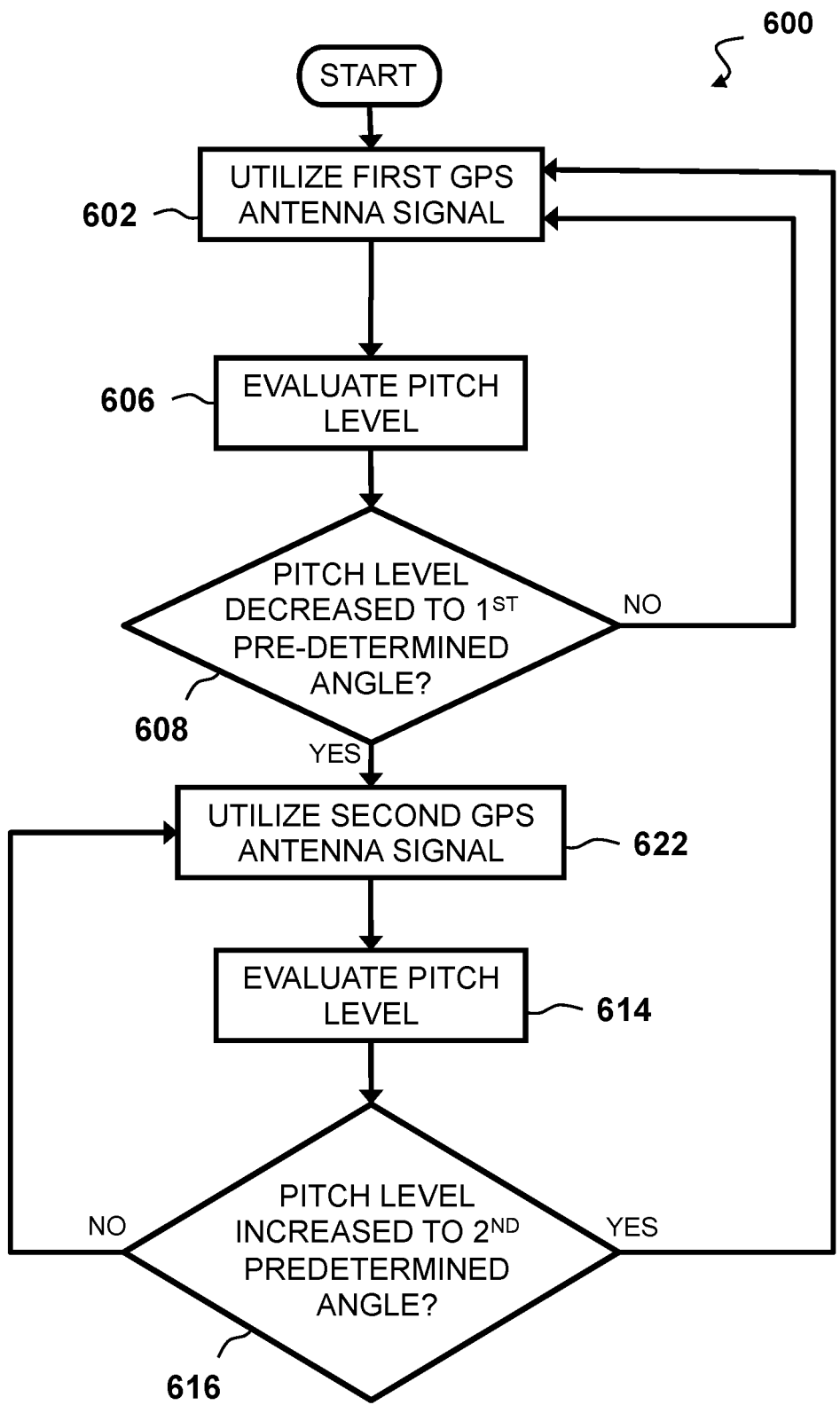
FIG. 6 depicts a process for transitioning from one GPS antenna signal to another in a dual-GPS system, according to one embodiment.

FIG. 6 depicts a process 600 for transitioning from one GPS antenna signal to another in a dual-GPS system, according to one embodiment. The process 600 can begin with the aerial vehicle only utilizing a first GPS antenna signal (step 602). In many embodiments, the system 600 can evaluate the pitch level of the aerial vehicle (step 606). If the pitch level has reached a first predetermined angle (step 608), the system 600 may switch to utilizing the second GPS antenna signal only (step 622). In many embodiments, the first predetermined pitch level angle may be sixty degrees from the starting pitch level. If the pitch level has not reached a first predetermined angle (step 608), the system 600 may continue to utilize the first GPS antenna signal only (step 602).

In a number of embodiments, a crossfade may be applied to the first GPS antenna signal and the second GPS antenna signal, which may begin with the second GPS antenna signal being low in comparison to the first GPS antenna signal. In numerous embodiments, the crossfade may be linear in nature in that the sum of the GPS antenna signals will be summed together to a uniform maximum level, i.e., the level of the first GPS antenna signal will be lowered in relation to the increase in the second GPS antenna signal level. In additional embodiments, the crossfade may be logarithmic in nature.

In further embodiments, the pitch level is again evaluated (step 614). In many further embodiments, the process 600 evaluates if a second predetermined pitch angle has been achieved (step 616). In certain additional embodiments, when the pitch level has not increased to the second predetermined angle (step 616), then only the second GPS antenna signal is utilized (step 622). Alternatively, when the second predetermined pitch angle is reached (step 616), then the process 600 switches to utilizing the first GPS antenna signal only (step 602). In certain further embodiments, the second predetermined angle can be sixty degrees from the starting pitch level. In still additional embodiments, when the pitch level has reached the second predetermined angle, only the second GPS antenna signal is utilized (step 622). When this occurs, the crossfade is complete. As can be appreciated by those skilled in the art, health checks can be performed on the aerial vehicle at any point in the process 600. By way of example, and not limitation, a health check could be performed that checks if a GPS signal is being received at all from either or both the GPS antennas and if a signal is lost on one, the process 600 may immediately switch to the alternative GPS antenna signal, and if both GPS antenna signals are lost, the process 600 may instruct the aerial vehicle to immediately transition to a safe recovery mode. By way of example and not limitation, safe recovery mode may include inertial navigation, a transition to hover flight, and/or initiating a landing routine.

Figure 7:
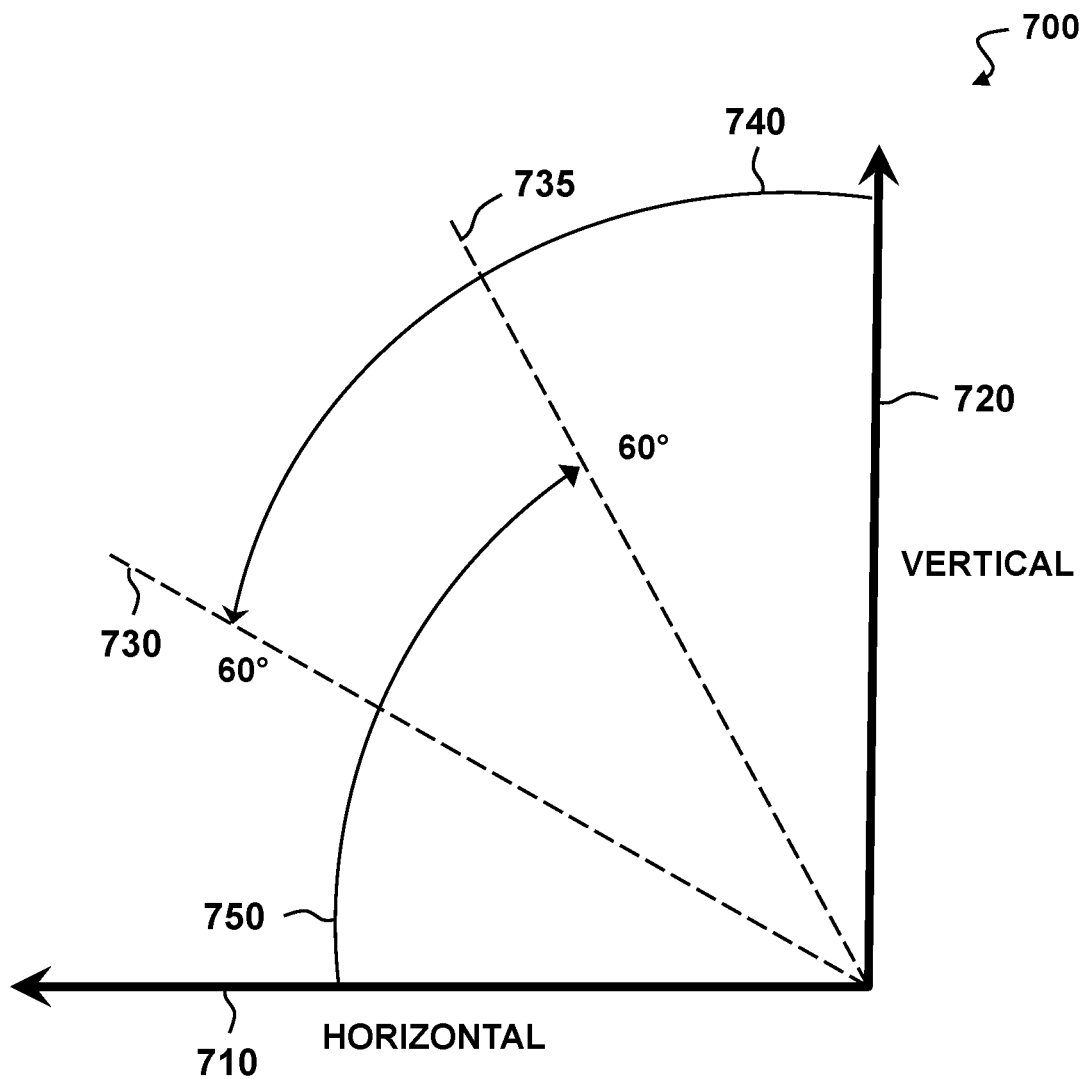
FIG. 7 depicts a visual conception of the GPS antenna switching, according to one embodiment.

FIG. 7 depicts a visual conception of the GPS antenna switching process, according to one embodiment. The switching illustration 700 displays a right angle with a vertical axis 720 representing the vertical angle of the VTOL aerial vehicle in a hover mode against a horizontal axis 710 representing the horizontal angle of the VTOL aerial vehicle when in a forward flight mode. In many embodiments, the VTOL aerial vehicle can transition from one flight mode to another, which can be understood as a transition from one axis to another in the switching illustration 700. The ninety-degree difference between two axes can be conceptually divided by two equally spaced angle dividers 730, 735 that create two overlapping zones of sixty degrees each. In a number of embodiments, the spacing of the angles may be any of a number of different combinations based on the use. In a first angle zone between the horizontal axis 710 and the first angle divider 730, only a first GPS signal 750 is utilized represented by the arrow. Likewise, between the vertical axis 720 and the second angle divider 735, a second GPS antenna signal 740 is utilized in a third angle zone, represented by the arrow extending from the vertical axis 720. In various embodiments, when the aerial vehicle pitch level reaches more than sixty degrees off axis, the GPS antenna signal is switched from the first GPS antenna on the nose to the second GPS antenna on the dorsal side of the aerial vehicle. Likewise, in additional embodiments, when the aerial vehicle pitch level reaches more than sixty degrees off of the vertical orientation, the aerial vehicle can switch from the first GPS antenna on the nose to the second GPS antenna on the dorsal side of the aerial vehicle. By way of example, and not limitation, the vertical axis 720 may be understood as being similar to the first position 301 of FIG. 3. Similarly, the horizontal axis 710 may be understood as the third position 305 of FIG. 3, and the crossfade area between the first and second angle dividers 730, 735 can be understood as the second position 303 of FIG. 3.

In some embodiments, no crossfading may be used between the first and second GPS antennas. From vertical 720 fight using a first GPS antenna in the nose, the aerial vehicle may pitch its nose down. Once the aerial vehicle hits a set rotation, such as sixty degrees 730, it may switch to the second GPS antenna in the dorsal side that is pointed skyward for forward flight. From horizontal 710 flight using the second GPS antenna in the dorsal side, the aerial vehicle may pitch its nose up. Once the aerial vehicle hits a set rotation, such as sixty degrees 735, it switches to the first GPS antenna that is pointed skyward for vertical flight. In some embodiments, the system disclosed herein may further determine when to switch between the GPS antennas based on which GPS antenna has the best signal strength from the best constellation and/or logic based on certain parameters. The system may use the quality of each signal and/or one or more set body angle thresholds to determine when to switch between the GPS antennas. At some latitudes, the first GPS antenna in the nose may be stronger than the second GPS antenna in the dorsal side at higher latitudes as the constellation may be lower along the horizon.

Figure 8:
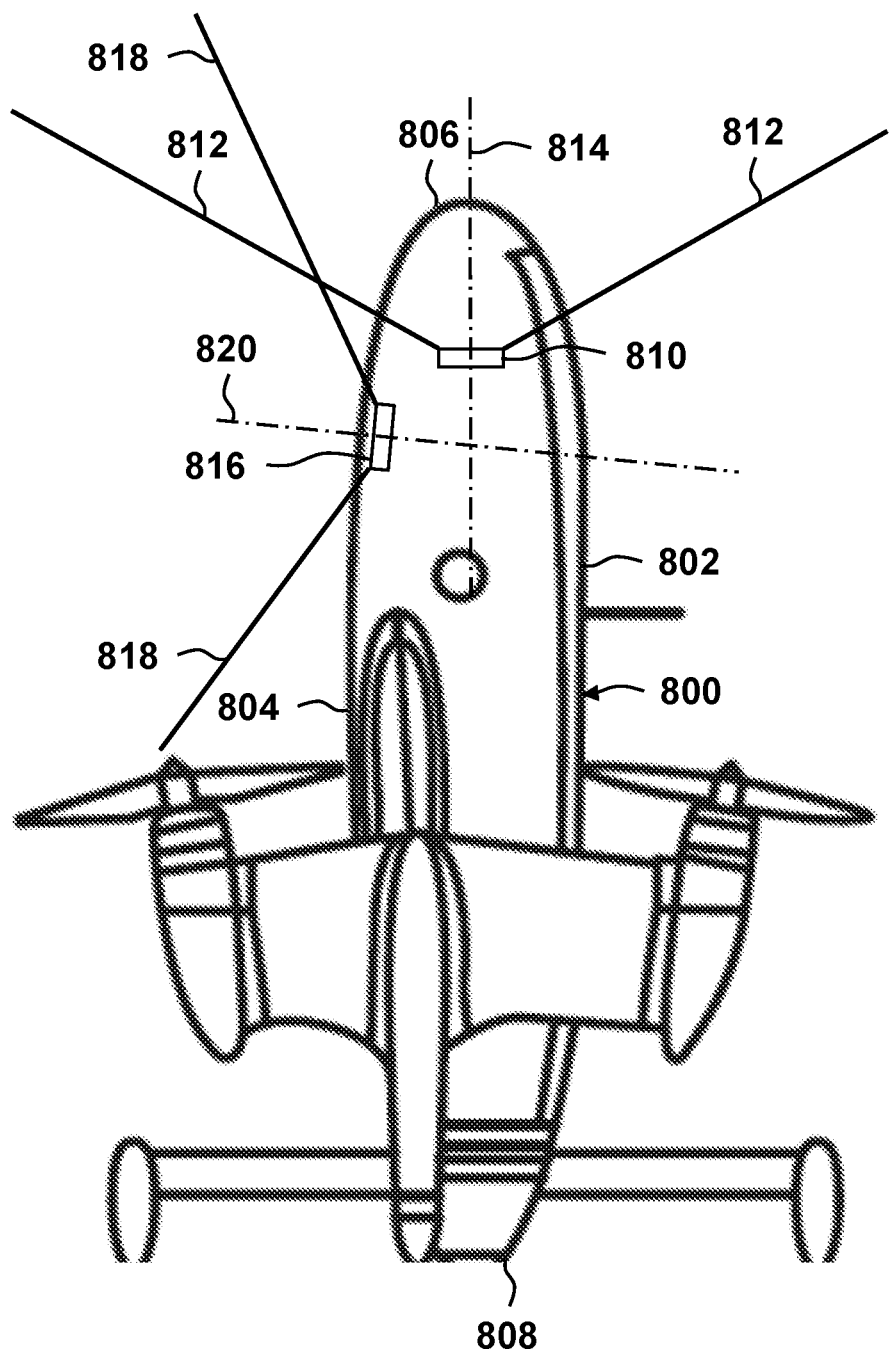
FIG. 8 depicts a side view of a vertical take-off and landing (VTOL) aerial vehicle having a dual GPS antenna system, according to one embodiment.

FIG. 8 depicts a side view of a vertical take-off and landing (VTOL) aerial vehicle 800 having a dual GPS antenna system, according to one embodiment. The aerial vehicle 800 may have a bottom side 802 that is oriented toward the ground in horizontal level flight. The aerial vehicle 800 may also have a dorsal side 804 that is oriented toward the sky in horizontal level flight. The dorsal side 804 is distal from the bottom side 802 of the aerial vehicle 800. The aerial vehicle may also include a nose 806 disposed toward a front of the aerial vehicle 806 and a rear side 808 disposed distal from the nose 806.

A first GPS antenna 810 may be disposed proximate the nose 806 of the aerial vehicle 800. The area between the first GPS antenna 810 and an exterior surface of the nose 806 may be clear of any carbon-based or metallic material that may impact a signal strength of the first GPS antenna 810. A first field of view 812 of the first GPS antenna 810 may emanate from the edges of the first GPS antenna 810 element. In some embodiments, the first field of view 812 may be about one hundred and twenty degrees. A first center field of view 814 of the first GPS antenna 810 may be oriented such that the first center field of view 814 is substantially vertical when the VTOL aerial vehicle 800 is in a nominal steady state hover attitude and/or a nominal steady state attitude for vertical flight.

A second GPS antenna 816 may be disposed proximate the dorsal side 814 of the aerial vehicle 800. The area between the second GPS antenna 816 and an exterior surface of the dorsal side 806 may be clear of any carbon-based or metallic material that may impact a signal strength of the second GPS antenna 816. A second field of view 818 of the second GPS antenna 816 may emanate from the edges of the second GPS antenna 816 element. In some embodiments, the second field of view 818 may be about one hundred and twenty degrees. A second center field of view 820 of the second GPS antenna 816 may be oriented such that the second center field of view 820 is substantially vertical when the VTOL aerial vehicle 800 is in a nominal pitch attitude for horizontal flight. The orientations of the first GPS antenna 810 and/or second GPS antenna 816 may be adjusted for alternate vehicle configurations having different nominal flight attitudes in order to maintain optimal skyward field of view in vertical and/or horizontal flight.

Figure 9A:
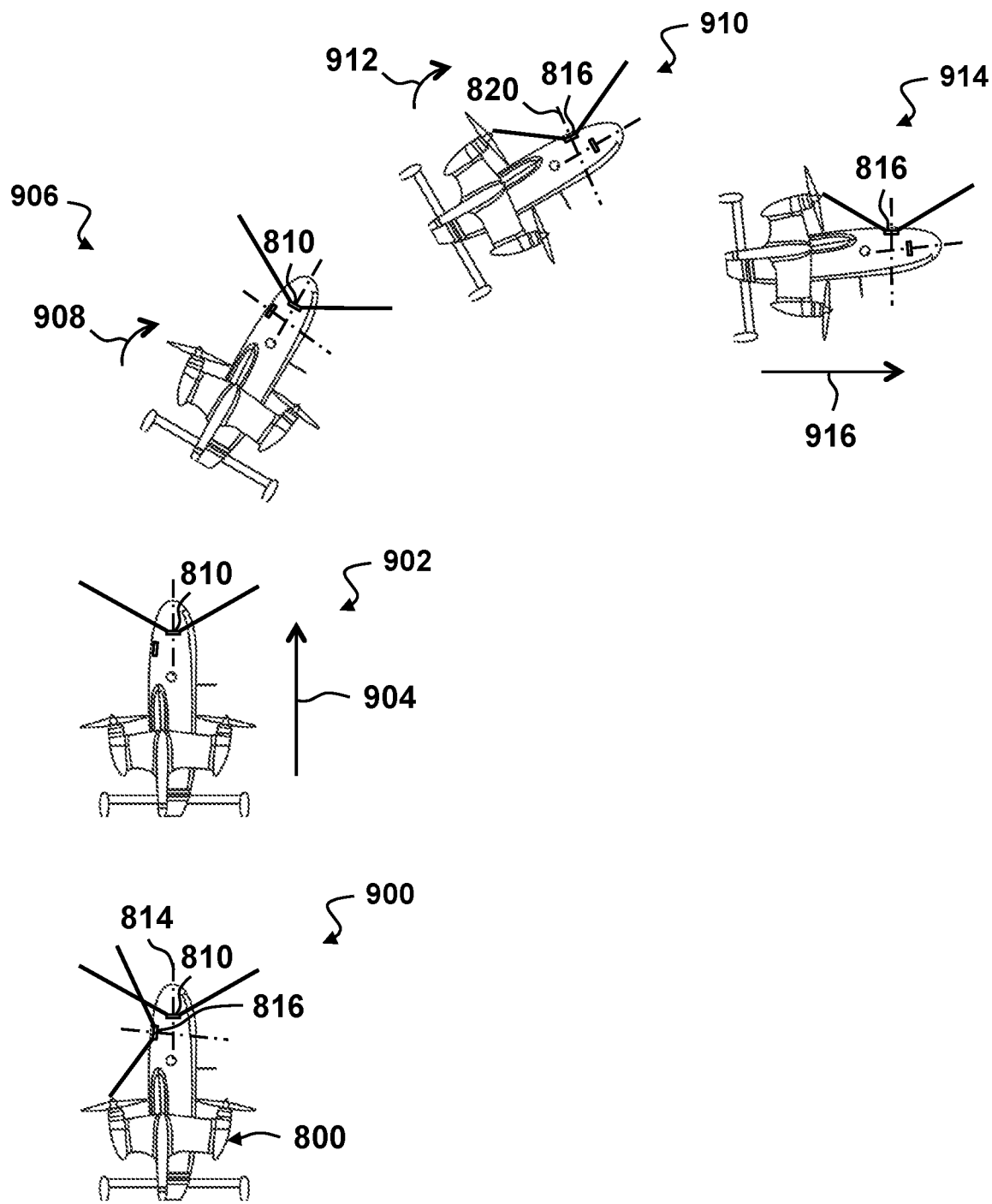
FIG. 9A depicts a take-off and horizontal flight of the VTOL aerial vehicle of FIG. 8, according to one embodiment.

FIG. 9A depicts a take-off and horizontal flight of the VTOL aerial vehicle 800 of FIG. 8, according to one embodiment. In a first position 900, the VTOL aerial vehicle 800 is on the ground prior to take-off. The system disclosed herein may perform a pre-flight check of the first GPS antenna 810 and/or the second GPS antenna 816. Prior to launch, the VTOL aerial vehicle 800 may switch to the first GPS antenna 810 having the first center field of view 814 oriented substantially vertical with respect to ground.

In a second position 902, the VTOL aerial vehicle 800 is in vertical flight 904. The VTOL aerial vehicle 902 uses the first GPS antenna 810 to navigate in vertical flight after launch. In a third position 906, the VTOL aerial vehicle 800 begins to rotate 908, or tip over. Once the VTOL aerial vehicle 800 reaches a set or desired height, the VTOL aerial vehicle 800 will begin to rotate 908. In the third position 906, the VTOL aerial vehicle 800 is shown at about a thirty-degree rotation from vertical. The VTOL aerial vehicle 800 continues to use the first GPS antenna 810 for navigation.

In a fourth position 912, the VTOL aerial vehicle 800 is transitioning from vertical flight to horizontal flight and continues to rotate 912. Once the VTOL aerial vehicle 800 rotates past a set, or threshold, angle, the system will switch from the first GPS antenna to the second GPS antenna 816. The second GPS antenna 816 has a second center field of view oriented substantially vertical with respect to ground during horizontal flight. In the embodiment shown in the fourth position 912, the VTOL aerial vehicle 800 has rotated 912 about sixty degrees from the initial vertical position.

Once the VTOL aerial vehicle 800 has rotated sixty degrees, the system switches from the first GPS antenna 810 to the second GPS antenna 816. The disclosed system waits for a set rotation amount, such as sixty degrees, to prevent inadvertent switching between the GPS antennas 810, 816, such as may be caused by VTOL aerial vehicle maneuvers such as ascents, descents, evasive actions, or the like. In some embodiments, the system may set an override to avoid switching between GPS antennas 810, 816 when certain actions are taken. For example, if the VTOL aerial vehicle 800 is set to perform a banked turn, the system may lock to one of the two GPS antennas 810, 816 until the turn is completed to avoid switching during the turn due to an inadvertent angle change. The set rotation amount may be varied based on the geometry and/or airframe of the VTOL aerial vehicle being used by the system disclosed herein. In some embodiments, an error may be detected in one of the GPS antennas 810, 816 and the set rotation amount may be adjusted so as to minimize time using the GPS antenna having the error. For example, if the first GPS antenna had an error causing low signal strength, but the second GPS antenna 816 was functioning normally, then the set rotation amount may be reduced to about 30 degrees or about forty-five degrees instead of about sixty degrees.

In a fifth position 914, the VTOL aerial vehicle 800 is in substantially horizontal flight 916. The second center field of view 820 of the second GPS antenna 816 may be oriented such that the second center field of view 820 is substantially vertical when the VTOL aerial vehicle 800 is in a nominal pitch attitude for horizontal flight 916. In the embodiment shown in the fifth position 914, it can be seen that the VTOL aerial vehicle 800 has its nose portion (806, FIG. 8) pitched slightly upwards. The angle between a front face of the first GPS antenna 810 and a front face of the second GPS antenna 816 may be substantially perpendicular in some embodiments. In other embodiments, the angle between a front face of the first GPS antenna 810 and a front face of the second GPS antenna 816 may be an acute angle to account for aerial vehicle geometry, such as an upward angle of a nose of an aerial vehicle in horizontal flight.

Figure 9B:
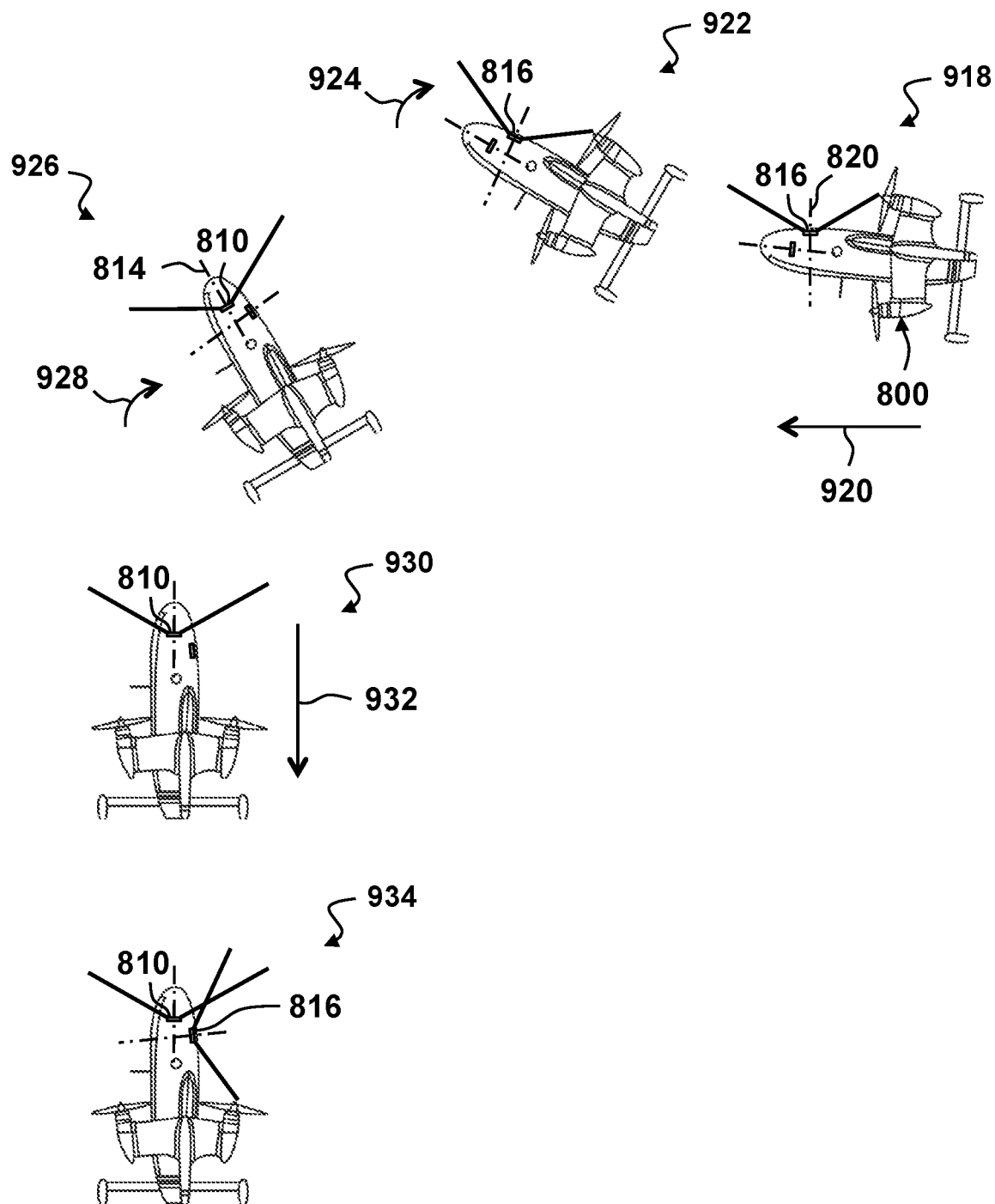
FIG. 9B depicts a horizontal flight and landing of the VTOL aerial vehicle of FIG. 8, according to one embodiment.

FIG. 9B depicts a horizontal flight and landing of the VTOL aerial vehicle 800 of FIG. 8, according to one embodiment. In a sixth position 918, the VTOL aerial vehicle 800 is in horizontal flight 920. The VTOL aerial vehicle 800 is using the second GPS antenna 816 having a second field of view 820 oriented such that the second center field of view 820 is substantially vertical when the VTOL aerial vehicle 800 is in a nominal pitch attitude for horizontal flight. Between the fifth position, as shown in FIG. 9A, and the sixth position 918, the VTOL aerial vehicle may have completed a mission, such as an imaging of a geographical area.

In a seventh position 922, the VTOL aerial vehicle 800 begins to rotate 924. In the seventh position 922 shown in FIG. 9B, the rotation is thirty degrees from horizontal flight and the second GPS antenna 816 continues to be used. In an eight position 926, the VTOL aerial vehicle 800 continues to rotate 928 and the GPS antenna switches from the second GPS antenna to the first GPS antenna 810. The first center field of view 814 of the first GPS antenna 810 may be oriented such that the first center field of view 814 is substantially vertical when the VTOL aerial vehicle 800 is in a nominal steady state hover attitude and/or a nominal steady state attitude for vertical flight. In the eighth position 926 shown in FIG. 9B, the rotation is sixty degrees from horizontal flight and the GPS antenna being used switches. The disclosed system waits for a set rotation amount, such as sixty degrees, to prevent inadvertent switching between the GPS antennas 810, 816, such as may be caused by VTOL aerial vehicle maneuvers such as ascents, descents, evasive actions, or the like.

In a ninth position 930, the VTOL aerial vehicle 800 begins a vertical descent 932 toward a landing position. The VTOL aerial vehicle 800 continues to use the first GPS antenna. In a tenth position 934, the VTOL aerial vehicle 800 has landed on the ground. The landing location may be the same as the take-off location. In some embodiments, the landing location may be different than the take-off location. The use of dual GPS antennas 810, 816 provides accuracy of position for the VTOL aerial vehicle 800 in both vertical and horizontal flight. This accuracy allows the VTOL aerial vehicle 800 to land in a much smaller space, or even the same space as the take-off, to a high degree of accuracy that is not practicable with a single dorsal side mounted GPS antenna. The use of manual landing, or a landing controlled by an operator may require a high level of skill and/or may increase the likelihood of damage to the VTOL aerial vehicle 800. The system may perform a post-flight check of the first GPS antenna 810 and/or the second GPS antenna 816. After landing, the VTOL aerial vehicle 800 may turn off both GPS antenna 810, 816.

Figure 10:
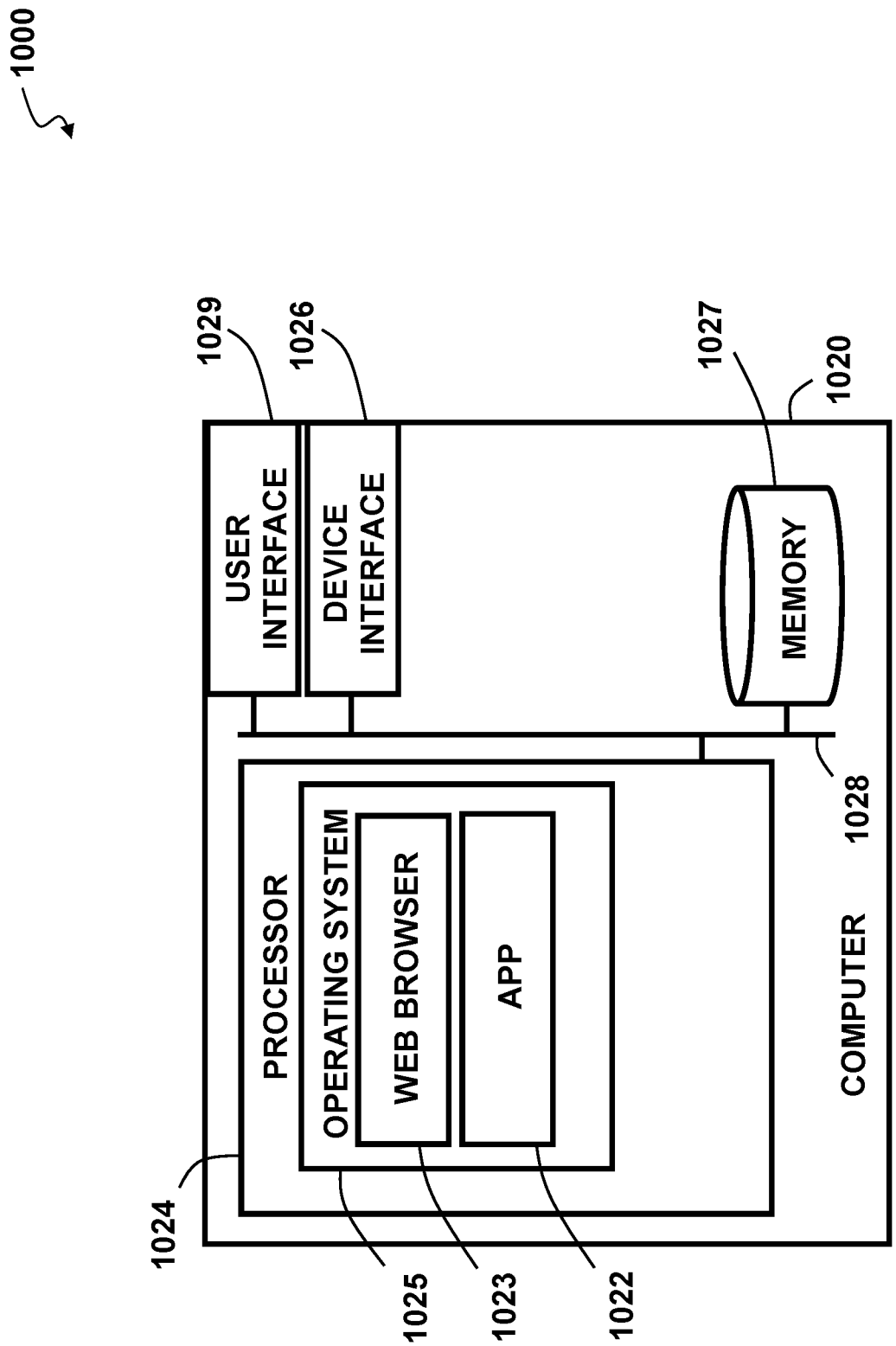
FIG. 10 illustrates an exemplary top-level functional block diagram of a computing device embodiment of a dual GPS antenna system.

FIG. 10 illustrates an exemplary top-level functional block diagram of a computing device embodiment of a dual GPS antenna system, according to one embodiment. The embodiment 1000 is shown as a computing device 1020 having a processor 1024, such as a central processing unit (CPU), addressable memory 1027, an external device interface 1026, e.g., an optional universal serial bus port and related processing, and/or an Ethernet port and related processing, and an optional user interface 1029, e.g., an array of status lights and one or more toggle switches, and/or a display, and/or a keyboard and/or a pointer-mouse system and/or a touch screen. Optionally, the addressable memory 1027 may for example be: flash memory, eprom, and/or a disk drive or other hard drive. These elements may be in communication with one another via a data bus 1028. The processor 1024 may have an operating system 1025 such as one supporting a web browser 1023 and/or applications 1022, which may be configured to execute steps of a process according to the exemplary embodiments described herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
   a vertical take-off and landing (VTOL) aerial vehicle;
   a first GPS antenna, the first GPS antenna disposed in a nose of the VTOL aerial vehicle;
   a second GPS antenna, the second GPS antenna disposed distal from the first GPS antenna;
   a GPS antenna switch;
   one or more aerial vehicle sensors; and
   an aerial vehicle flight controller comprising a processor having addressable memory, the flight controller in communication with the GPS antenna switch and the one or more aerial vehicle sensors, wherein the flight controller is configured to:

utilize a GPS antenna signal via the GPS antenna switch from at least one of: the first GPS antenna and the second GPS antenna;

receive a pitch level of the aerial vehicle from the one or more aerial vehicle sensors in at least one of: vertical flight and horizontal flight;

determine if the received pitch level is at a set rotation from at least one of: vertical and horizontal; and utilize the GPS signal not being utilized via the GPS antenna switch if the determined pitch level is at or above the set rotation;

wherein the set rotation prevents inadvertent switching between the first GPS antenna and the second GPS antenna during one or more VTOL aerial vehicle maneuvers.

2. The system of claim 1, wherein an area between the first GPS antenna and an exterior surface of the nose is substantially clear of any carbon-based or metallic material, wherein the second GPS antenna is disposed in a dorsal side of the VTOL aerial vehicle, and wherein a second center field of view of the second GPS antenna is oriented such that the second center field of view is substantially vertical when the VTOL aerial vehicle is in a nominal pitch attitude for horizontal flight.

3. The system of claim 1, wherein a first center field of view of the first GPS antenna is oriented such that the first center field of view is substantially vertical when the VTOL aerial vehicle is in a nominal steady state hover attitude.

4. The system of claim 1, wherein a first center field of view of the first GPS antenna is oriented such that the first center field of view is substantially vertical when the VTOL aerial vehicle is in a nominal steady state attitude for vertical flight.

5. The system of claim 1, wherein the one or more VTOL aerial vehicle maneuvers comprise one or more of: an ascent, a descent, an evasive action, and a banked turn.

6. The system of claim 1, wherein the flight controller is further configured to:
detect an error in at least one of: the first GPS antenna and the second GPS antenna; and
adjust the set rotation when the error is detected to minimize time using the GPS antenna having the error.

7. The system of claim 1, wherein the flight controller is further configured to:
utilize a GPS antenna signal from the first GPS antenna in a vertical flight of the VTOL aerial vehicle via the GPS antenna switch.

8. The system of claim 7, wherein the flight controller is further configured to:
receive a pitch level of the aerial vehicle in the vertical flight from the one or more aerial vehicle sensors.

9. The system of claim 8, wherein the flight controller is further configured to:
determine if the received pitch level is at a set rotation from vertical; and
utilize the GPS signal from the second GPS antenna via the GPS antenna switch if the determined pitch level is at or above the set rotation from vertical.

10. The system of claim 9, wherein the flight controller is further configured to:
receive a pitch level of the aerial vehicle in a horizontal flight from the one or more aerial vehicle sensors.

11. The system of claim 10, wherein the flight controller is further configured to:
determine if the received pitch level is at a set rotation from horizontal; and
utilize the GPS signal from the first GPS antenna via the GPS antenna switch if the determined pitch level is at or above the set rotation from horizontal.

12. The system of claim 10, wherein a first center field of view of the first GPS antenna is substantially perpendicular to a second center field of view of the second GPS antenna.

13. The system of claim 1, wherein the VTOL aerial vehicle is an unmanned aerial vehicle (UAV).

14. The system of claim 1, further comprising:
a primary GPS receiver in communication with the flight controller; and
a secondary GPS receiver in communication with the flight controller.

15. The system of claim 14, wherein the flight controller is further configured to:
switch between the primary GPS receiver and the secondary GPS receiver based on at least one of: a signal quality of the primary GPS receiver, a signal quality of the secondary GPS receiver, a number of satellites in the visible constellation of the primary GPS receiver, and a number of satellites in the visible constellation of the secondary GPS receiver.

16. A method comprising:
utilizing, by an aerial vehicle flight controller comprising a processor having addressable memory, a GPS antenna signal from a first GPS antenna in a vertical flight of a vertical take-off and landing (VTOL) aerial vehicle via a GPS antenna switch;
receiving, by the flight controller, a pitch level of the aerial vehicle in the vertical flight from one or more aerial vehicle sensors;
determining, by the flight controller, if the received pitch level is at a set rotation from vertical; and
utilizing, by the flight controller, the GPS signal from a second GPS antenna via the GPS antenna switch if the determined pitch level is at or above the set rotation from vertical;
wherein the set rotation prevents inadvertent switching between the first GPS antenna and the second GPS antenna during one or more VTOL aerial vehicle maneuvers.

17. The method of claim 16, wherein the first GPS antenna is disposed in a nose of the VTOL aerial vehicle, wherein the second GPS antenna is disposed in a dorsal side of the VTOL aerial vehicle, wherein a first center field of view of the first GPS antenna is oriented such that the first center field of view is substantially vertical when the VTOL aerial vehicle is in a nominal steady state hover attitude, and wherein a second center field of view of the second GPS antenna is oriented such that the second center field of view is substantially vertical when the VTOL aerial vehicle is in a nominal pitch attitude for horizontal flight.

18. The method of claim 16 further comprising:
receiving, by the flight controller, a pitch level of the aerial vehicle in a horizontal flight from the one or more aerial vehicle sensors;
determining, by the flight controller, if the received pitch level is at a set rotation from horizontal; and
utilizing, by the flight controller, the GPS signal from the first GPS antenna via the GPS antenna switch if the determined pitch level is at or above the set rotation from horizontal.

19. The method of claim 16 further comprising:
switching, by the flight controller, between a primary GPS receiver and a secondary GPS receiver based on at least one of: a signal quality of the primary GPS receiver, a signal quality of the secondary GPS receiver, a number of satellites in the visible constellation of the primary GPS receiver, and a number of satellites in the visible constellation of the secondary GPS receiver;

wherein the primary GPS receiver is in communication with the flight controller, and wherein the secondary GPS receiver is in communication with the flight controller.

20. A system, comprising:
a vertical take-off and landing (VTOL) aerial vehicle;
a first GPS antenna, the first GPS antenna disposed in a nose of the VTOL aerial vehicle, wherein an area between the first GPS antenna and an exterior surface of the nose is substantially clear of any carbon-based or metallic material, and wherein a first center field of view of the first GPS antenna is oriented such that the first center field of view is substantially vertical when the VTOL aerial vehicle is in at least one of: a nominal steady state hover attitude and a nominal steady state attitude for vertical flight;
a second GPS antenna, the second GPS antenna disposed in a dorsal side of the VTOL aerial vehicle, wherein a second center field of view of the second GPS antenna is oriented such that the second center field of view is substantially vertical when the VTOL aerial vehicle is in a nominal pitch attitude for horizontal flight;
a GPS antenna switch;
one or more aerial vehicle sensors; and
an aerial vehicle flight controller comprising a processor having addressable memory, the aerial vehicle flight controller in communication with the GPS antenna switch and the one or more aerial vehicle sensors, wherein the aerial vehicle flight controller is configured to:
utilize a GPS antenna signal from the first GPS antenna in a vertical flight of the VTOL aerial vehicle via the GPS antenna switch;
receive a pitch level of the aerial vehicle in the vertical flight from the one or more aerial vehicle sensors;
determine if the received pitch level is at a set rotation from vertical;
utilize the GPS signal from the second GPS antenna via the GPS antenna switch if the determined pitch level is at or above the set rotation from vertical;
receive a pitch level of the aerial vehicle in a horizontal flight from the one or more aerial vehicle sensors;
determine if the received pitch level is at a set rotation from horizontal; and
utilize the GPS signal from the first GPS antenna via the GPS antenna switch if the determined pitch level is at or above the set rotation from horizontal;
wherein the set rotation prevents inadvertent switching between the first GPS antenna and the second GPS antenna during one or more VTOL aerial vehicle maneuvers.

* * * * *